(12) United States Patent
Greenwood et al.

(10) Patent No.: US 12,475,051 B1
(45) Date of Patent: Nov. 18, 2025

(54) SHARED DONOR MEMORY COMPUTE INSTANCES

(71) Applicant: Amazon Technologies, Inc., Seattle, WA (US)

(72) Inventors: Christopher Magee Greenwood, Seattle, WA (US); Meiwen Li, Mercer Island, WA (US); Eric Jeffrey Heinz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/541,547

(22) Filed: Dec. 15, 2023

(51) Int. Cl.
*G06F 12/084* (2016.01)
*G06F 12/0811* (2016.01)

(52) U.S. Cl.
CPC ........ *G06F 12/084* (2013.01); *G06F 12/0811* (2013.01); *G06F 2212/283* (2013.01)

(58) Field of Classification Search
CPC .............. G06F 12/084; G06F 12/0811; G06F 2212/283
USPC ......................................... 711/130, 121, 119
See application file for complete search history.

(56) References Cited

U.S. PATENT DOCUMENTS

| | | |
|---|---|---|
| 11,392,497 B1 | 7/2022 | Brooker et al. |
| 11,550,713 B1 | 1/2023 | Piwonka et al. |
| 11,593,270 B1 | 2/2023 | Brooker et al. |
| 2013/0318283 A1* | 11/2013 | Small .................. G06F 12/0802 711/E12.008 |
| 2018/0293164 A1* | 10/2018 | Perez .................. G06F 9/45558 |
| 2024/0078178 A1* | 3/2024 | Durbhakula ........ G06F 12/0802 |
| 2024/0256452 A1* | 8/2024 | Kang .................. G06F 12/0804 |

OTHER PUBLICATIONS

Barresi, Antonio, Kaveh Razavi, Mathias Payer, and Thomas R. Gross. (Aug. 2015). "{CAIN}: Silently Breaking ASLR in the Cloud." In 9th USENIX Workshop on Offensive Technologies (WOOT 15). URL: https://www.usenix.org/system/files/conference/woot15/woot15-paper-barresi.pdf, 9 pages.

(Continued)

*Primary Examiner* — Hashem Farrokh
(74) *Attorney, Agent, or Firm* — Athorus, PLLC

(57) ABSTRACT

Described are systems and methods that use a donor memory that is accessible from multiple compute instances to access and execute portions of user data stored on the donor memory, thereby decreasing the time required to initialize a compute instance. Upon receipt of a first request to execute a user data, a compute instance group is initialized that includes a donor memory and a donor file system. At least a portion of the requested user data, or a snapshot of at least a portion of the user data, is loaded into the donor memory and a first compute instance is initialized in the compute instance group to execute the user data from the donor memory. Upon receipt of a second request to execute the user data, rather than having to again load the portion of the user data (or snapshot), a second compute instance is initialized within the compute instance group that is able to directly access the donor memory and execute the user data.

20 Claims, 14 Drawing Sheets

(56) References Cited

OTHER PUBLICATIONS

Briongos, Samira, Pedro Malagón, José M. Moya, and Thomas Eisenbarth. "{Reload+ Refresh}: Abusing Cache Replacement Policies to Perform Stealthy Cache Attacks." In 29th USENIX Security Symposium (USENIX Security 20), Aug. 12-14, 2020, pp. 1967-1984. URL: https://www.usenix.org/system/files/sec20-briongos_0.pdf.

Fog, Agner. The Microarchitecture of Intel, AMD, and VIA CPUs. Technical University of Denmark. Copyright © 1996—2023. Last updated May 26, 2023. URL: https://www.agner.org/optimize/microarchitecture.pdf, 271 pages.

Horn, Jann. Project Zero: Reading privileged memory with a side-channel. https://googleprojectzero.blogspot.com/, Google Project Zero, Wednesday, Jan. 3, 2018, URL: https://googleprojectzero.blogspot.com/2018/01/reading-privileged-memory-with-side.html, 29 pages.

Intel, "Intel Analysis of Speculative Execution Side Channels," www.intel.com, Intel, Jan. 2018, URL: https://www.intel.com/content/www/us/en/developer/articles/technical/software-security-guidance/technical-documentation/analysis-speculative-execution-side-channels.html, 8 pages.

Kim, Jeremie S., Minesh Patel, A. Giray Yağlkçi, Hasan Hassan, Roknoddin Azizi, Lois Orosa, and Onur Mutlu. "Revisiting RowHammer: An Experimental Analysis of Modern DRAM Devices and Mitigation Techniques." In 2020 ACM/IEEE 47th Annual International Symposium on Computer Architecture (ISCA), pp. 638-651. IEEE, 2020. URL: https://arxiv.org/pdf/2005.13121.pdf.

Razavi, Kaveh, Ben Gras, Erik Bosman, Bart Preneel, Cristiano Giuffrida, and Herbert Bos. "Flip Feng Shui: Hammering a Needle in the Software Stack." In 25th USENIX Security Symposium (USENIX Security 16), pp. 1-18. 2016. URL: https://www.cs.vu.nl/~kaveh/pubs/pdf/ffs-usenixsec16.pdf.

Ristenpart, Thomas, Eran Tromer, Hovav Shacham, and Stefan Savage. "Hey, You, Get Off of My Cloud: Exploring Information Leakage in Third-Party Compute Clouds." In Proceedings of the 16th ACM Conference on Computer and Communications Security, pp. 199-212. 2009. URL: https://rist.tech.cornell.edu/papers/cloudsec.pdf.

Su, Chao, and Qingkai Zeng. "Survey of CPU Cache-Based Side-Channel Attacks: Systematic Analysis, Security Models, and Countermeasures." Security and Communication Networks 2021 (2021): 1-15. URL: https://downloads.hindawi.com/journals/scn/2021/5559552.pdf.

Xiao, Jidong, Zhang Xu, Hai Huang, and Haining Wang. "Security Implications of Memory Deduplication in a Virtualized Environment." In 2013 43rd Annual IEEE/IFIP International Conference on Dependable Systems and Networks (DSN), pp. 1-12. IEEE, 2013. URL: https://www.eecis.udel.edu/~hnw/paper/memdedup.pdf.

Yarom, Yuval, and Katrina Falkner. "{Flush+ Reload}: A High Resolution, Low Noise, L3 Cache Side-Channel Attack." In 23rd USENIX Security Symposium (USENIX Security 14), Aug. 20-22, 2014, San Diego, CA, pp. 719-732. URL: https://www.usenix.org/system/files/conference/usenixsecurity14/sec14-paper-yarom.pdf.

Zhang, Rui, Xiaojun Su, Jianping Wang, Cong Wang, Wenyin Liu, and Rynson WH Lau. "On Mitigating the Risk of Cross-VM Covert Channels in a Public Cloud." IEEE Transactions on Parallel and Distributed Systems 26, No. 8 (2014): 2327-2339.

\* cited by examiner

SHARED DONOR MEMORY COMPUTE INSTANCES

BACKGROUND

Cloud computing, in general, is an approach to providing access to information technology resources through services, such as Web services, where the hardware and/or software used to support those services is dynamically scalable to meet the needs of the services at any given time. In cloud computing, elasticity refers to network-delivered computing resources that can be scaled up and down by the cloud service provider to adapt to changing requirements of users. The elasticity of these resources can be in terms of processing power, storage, bandwidth, etc. Elastic computing resources may be delivered automatically and on-demand, dynamically adapting to the changes in resource requirements on or within a given user's system. For example, a user can use a cloud service to host a large online streaming service, set up with elastic resources so that the number of webservers streaming content to users scale up to meet bandwidth requirements during peak viewing hours, and then scale back down when system usage is lighter.

A user typically will rent, lease, or otherwise pay for access to resources through the cloud, and thus does not have to purchase and maintain the hardware and/or software to provide access to these resources. This provides a number of benefits, including allowing users to quickly reconfigure their available computing resources in response to the changing demands of their enterprise, and enabling the cloud service provider to automatically scale provided computing service resources based on usage, traffic, or other operational needs. This dynamic nature of network-based computing services, in contrast to a relatively static infrastructure of on-premises computing environments, requires a system architecture that can reliably re-allocate its hardware according to the changing needs of its user base.

DETAILED DESCRIPTION

As is set forth in greater detail below, implementations of the present disclosure are directed toward the use of a donor memory that is accessible by multiple compute instances to access and/or execute portions of user data stored on the donor memory, thereby decreasing the time required to initialize a compute instance. As discussed further below, upon receipt of a first request for user data, a compute instance group ("CI group") is initialized that includes a donor memory and a donor file system. At least a portion of the requested user data, or a snapshot of at least a portion of the user data, is loaded into the donor memory and a first compute instance is initialized in the CI group to execute the user data. Upon receipt of a second request to execute the user data, rather than having to again load the portion of the user data (or snapshot), a second compute instance is initialized within the CI group that is able to directly access the donor memory and execute the user data.

Figure 1:
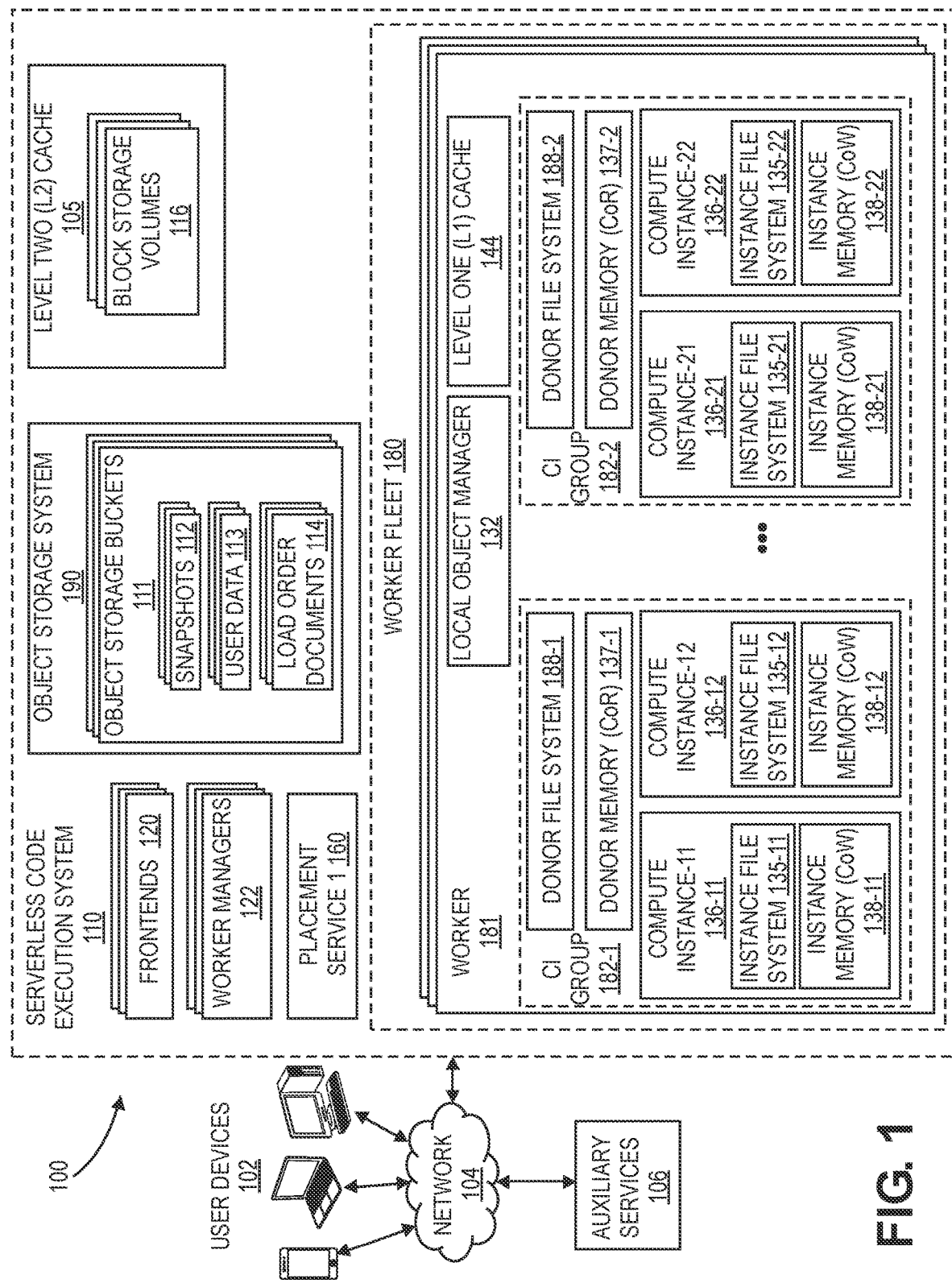
FIG. 1 is an illustration of an example environment, in accordance with implementations of the present disclosure.

FIG. 1 is a block diagram of an illustrative operating environment 100 in which user devices 102 may interact with a serverless code execution system 110 via a network 104. By way of illustration, various example user devices 102 are shown in communication with the serverless code execution system 110, including a desktop computer, laptop, and a mobile phone. In general, the user devices 102 can be any computing device such as a desktop, laptop or tablet computer, personal computer, wearable computer, server, personal digital assistant ("PDA"), hybrid PDA/mobile phone, mobile phone, electronic book reader, set-top box, voice command device, camera, digital media player, and the like. The serverless code execution system 110 may provide the user devices 102 with one or more user interfaces, command-line interfaces ("CLI"), application programing interfaces ("API"), and/or other programmatic interfaces for generating and uploading user-executable user data (e.g., represented as part of a disk image, represented as part of a container image, represented as part of a virtual machine image, an association with a data set depended on by the code, etc.), invoking the user-provided code (e.g., submitting a request to execute the user data on the serverless code execution system 110), scheduling event-based code executions or timed code executions, tracking the user-provided user data, and/or viewing other logging or monitoring information related to their requests and/or user data. Although one or more implementations may be described herein as using a user interface, it should be appreciated that such implementations may, additionally or alternatively, use any CLIs, APIs, or other programmatic interfaces.

The illustrative environment 100 further includes one or more auxiliary services 106, which can interact with the serverless code execution system 110 to implement desired functionality on behalf of a user. Auxiliary services 106 can correspond to network-connected computing devices, such as servers, which generate data accessible to the serverless code execution system 110 or otherwise communicate to the serverless code execution system 110. For example, the auxiliary services 106 can include web services (e.g., associated with the user devices 102, with the serverless code execution system 110, or with third parties), databases, really simple syndication ("RSS") readers, social networking sites, or any other source of network-accessible service or data source. In some instances, auxiliary services 106 may be invoked by code execution on the serverless code execution system 110, such as by API calls to the auxiliary services 106. In some instances, auxiliary services 106 may be associated with the serverless code execution system 110, e.g., to provide billing or logging services to the serverless code execution system 110. In some instances, auxiliary services 106 actively transmit information, such as API calls or other user data-triggering information, to the serverless code execution system 110. In other instances, auxiliary services 106 may be passive, such that data is made available for access by the serverless code execution system 110. For example, components of the serverless code execution system 110 may periodically poll such passive data sources, and trigger execution of code within the serverless code execution system 110 based on the data provided. While depicted in FIG. 1 as distinct from the user devices 102 and the serverless code execution system 110, in some implementations, various auxiliary services 106 may be implemented by either the user devices 102 or the serverless code execution system 110.

The user devices 102, auxiliary services 106, and serverless code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some implementations, the network 104 may be a private or semi-private network, such as a corporate or university intranet. The network 104 may include one or more wireless networks, such as a Global System for Mobile Communications ("GSM") network, a Code Division Multiple Access ("CDMA") network, a Long Term Evolution ("LTE") network, or any other type of wireless network. The network 104 can use protocols and components for communicating via the Internet or any of the other aforementioned types of networks. For example, the protocols used by the network 104 may include Hypertext Transfer Protocol ("HTTP"), HTTP Secure ("HTTPS"), Message Queue Telemetry Transport ("MQTT"), Constrained Application Protocol ("CoAP"), and the like. Protocols and components for communicating via the Internet or any of the other aforementioned types of communication networks are well known to those skilled in the art and, thus, are not described in more detail herein.

The serverless code execution system 110 is depicted in FIG. 1 as operating in a distributed computing environment including several computer systems that are interconnected using one or more computer networks. The serverless code execution system 110 could also operate within a computing environment having a fewer or greater number of devices than are illustrated in FIG. 1. Thus, the depiction of the serverless code execution system 110 in FIG. 1 should be taken as illustrative and not limiting to the present disclosure. For example, the serverless code execution system 110 or various constituents thereof could implement various Web services components, hosted or "cloud" computing environments, and/or peer to peer network configurations to implement at least a portion of the processes described herein.

Further, the serverless code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the serverless code execution system 110 is illustrated as connected to the network 104. In some implementations, any of the components within the serverless code execution system 110 can communicate with other components of the serverless code execution system 110 via the network 104. In other implementations, not all components of the serverless code execution system 110 are capable of communicating with other components of the environment 100. In one example, only the frontends 120 may be connected to the network 104, and other components of the serverless code execution system 110 may communicate with other components of the environment 100 via the frontends 120.

In FIG. 1, users, by way of user devices 102, may interact with the serverless code execution system 110 to provide user data and establish rules or logic defining when and how such code should be executed on the serverless code execution system 110. For example, a user may wish to run a piece of user data in connection with a web or mobile application that the user has developed. One way of running the user data would be to acquire virtual machine instances from service providers who provide infrastructure as a service, configure the virtual machine instances to suit the user's needs, and use the configured virtual machine instances to run the user data. In order to avoid the complexity of this process, the user may alternatively provide the user data to the serverless code execution system 110, and request that the serverless code execution system 110 execute the user data using one or more execution environments that are managed by the system 110. The serverless code execution system 110 can handle the acquisition and configuration of compute capacity (e.g., containers, instances, etc., which are described in greater detail below) based on the code execution request, and execute the user data using the compute capacity. The serverless code execution system 110 may automatically scale up and down based on the volume of requests to execute user data, thereby relieving the user from the burden of having to worry about over-utilization (e.g., acquiring too little computing resources and suffering performance issues) or under-utilization (e.g., acquiring more computing resources than necessary to run the code, and thus overpaying).

To enable interaction with the serverless code execution system 110, the system 110 includes multiple frontends 120, which enable interaction with the serverless code execution system 110. In an illustrative implementation, the frontends 120 serve as a "front door" to the other services provided by the serverless code execution system 110, enabling users (via user devices 102) to provide, request execution of, and view results of computer executable user data. The frontends 120 include a variety of components to enable interaction between the serverless code execution system 110 and other computing devices. For example, each frontend 120 may include a request interface providing user devices 102 with the ability to upload or otherwise communicate user-specified code and associated data sets to the serverless code execution system 110 (e.g., in the form of a disk image) and to thereafter request execution of that user data. In one implementation, the request interface communicates with external computing devices (e.g., user devices 102, auxiliary services 106, etc.) via a graphical user interface ("GUI"), CLI, or API. The frontends 120 process the requests and make sure that the requests are properly authorized. For example, the frontends 120 may determine whether the user associated with the request is authorized to access the user data specified in the request.

References to user data as used herein may refer to any program code (e.g., a program, routine, subroutine, thread, etc.) written in a specific program language. In the present disclosure, the terms "source code," "user data," and "program code," may be used interchangeably. User data which has been compiled for execution on a specific device is generally referred to herein as "machine code." Both "source code" and "machine code" are representations of the same instructions, which may be collectively referred to as "code" or "user data." Such code may be executed to achieve a specific function, for example, in connection with a particular web application or mobile application developed by the user. User data may be written, by way of non-limiting example, in JavaScript (e.g., node.js), Java, Python, and/or Ruby (and/or another programming language). User data may be triggered or called for execution on the serverless code execution system 110 in a variety of manners. In one implementation, a user or other computing device may transmit a request for the user data, which can generally be referred to as "call" to execute of the user data. Such calls may include an identifier of the user data and, in some instances, one or more arguments to be used for executing the user data. A request interface of the frontend 120 may receive calls to execute user data as HTTPS requests from a user. Also, any information (e.g., headers and parameters) included in the HTTPS request may also be processed and utilized when executing a user data. As discussed above, any other protocols, including, for example, HTTP, MQTT, and CoAP, may be used to transfer the message containing a user data call to the request interface.

Prior to calling for execution of a user data, an end user may publish the user data. In one implementation, the user data is provided in the form of a disk image containing the user data. The disk image and associated metadata for the user data (e.g., the end user who "owns" the user data or other information regarding the user data) may be stored within an object storage system 190. The object storage system 190 of FIG. 1 may represent any of a number of object storage systems, such as AMAZON™'s SIMPLE STORAGE SERVICE™ (or "S3™"). In accordance with implementations of the present disclosure, a disk image may further be divided into a number of portions, each stored as a separate object on the object storage system 190. These portions may be stored as user data 113 in an object storage bucket 111 on the object storage system 190. Likewise, the disk image may be loaded, executed, and one or more snapshots generated at specific points in time for use in rapidly deploying the user data of the disk image. Snapshots may be stored as snapshots 112 in an object storage bucket 111. Each object storage bucket 111 may also include load order documents 114 specifying the load order for portions of the user data 113 or snapshots 112.

For example, the snapshots 112 may include snapshots taken of the code execution environments at specific points in time and subsequently pre-loaded onto a donor memory, discussed below, used for code executions, in anticipation of or in response to requests to perform such code executions corresponding to the snapshots. Additional details regarding the snapshots 112 and how the snapshots 112 are used to reduce the latency associated with code execution are described in greater detail below with reference to FIGS. 8A-10. The user data 113 may include user data uploaded and/or published by a user and executed in response to requests from the user (or another user of the system) on a per-request basis. The load order documents 114 include information about which portions of the snapshots 112 may be prioritized in pre-loading the snapshots 112. Additional details of the load order documents 114 are described in greater detail below with reference to FIG. 7.

As noted above, user data may be triggered for execution at the serverless code execution system 110 based on explicit calls from user devices 102 (e.g., as received at a request interface). Alternatively or additionally, user data may be triggered for execution at the serverless code execution system 110 based on data retrieved from one or more auxiliary services 106. To facilitate interaction with auxiliary services 106, the frontend 120 can include a polling interface, which operates to poll auxiliary services 106 for data. Illustratively, the polling interface may periodically transmit a request to one or more user-specified auxiliary services 106 to retrieve any newly available data (e.g., social network "posts," news articles, files, records, etc.), and to determine whether that data corresponds to user-established criteria triggering execution of user data on the serverless code execution system 110. Illustratively, criteria for execution of user data may include, but is not limited to, whether new data is available at the auxiliary services 106, the type or content of the data, or timing information corresponding to the data. In some instances, the auxiliary services 106 may function to notify the frontend 120 of the availability of new data, and thus the polling service may be unnecessary with respect to such services.

In addition to user data accessed based on explicit user calls and data from auxiliary services 106, the serverless code execution system 110 may in some instances operate to trigger execution of user data independently. For example, the serverless code execution system 110 may operate (based on instructions from a user) to trigger execution of a user data at each of a number of specified time intervals (e.g., every 10 minutes).

The frontend 120 can further include an output interface configured to output information regarding the execution of user data on the serverless code execution system 110. Illustratively, the output interface may transmit data regarding user data executions (e.g., results of a user data, errors related to the user data execution, or details of the user data execution, such as total time required to complete the execution, total data processed via the execution, etc.) to the user devices 102 or to auxiliary services 106, which may include, for example, billing or logging services. The output interface may further enable transmission of data, such as service calls, to auxiliary services 106. For example, the output interface may be utilized during execution of a user data to transmit an API request to an auxiliary service 106 (e.g., to store data generated during execution of the user data).

Code executions triggered on the serverless code execution system 110 of FIG. 1 are executed by execution environments hosted by a set of workers 181 within a worker fleet 180. Each worker 181 is illustratively a host device configured to host multiple execution environments, which in FIG. 1 are virtual machine ("VM") instances 136, as referred to herein as "compute instance" or simply "instance." Execution environments may alternatively include software containers, sometimes referred to as "OS-level virtualization," another virtualization technology known in the art. Thus, where references are made herein to compute instances 136, it should be understood that (unless indication is made to the contrary) a container may be substituted for such instances 136.

As illustrated in FIG. 1, each worker 181 may host a number of instances 136-11, 136-12, 136-21, 136-22. In some implementations, each instance 136 may be isolated from other instances 136, thus ensuring the security of code executions on the serverless code execution system 110. For example, each instance 136 may be divided by a virtualization boundary, by virtue of the instance 136 being a virtual machine hosted by the worker 181. In addition, each instance 136 may exist within a user space on the worker 181, which logically partitions resources of the worker 181. Each user space may, for example, represent a "chroot" jail—a known isolation technique for LINUX™ operating systems.

As discussed further herein, in some implementations, one or more compute instances 136 may be included in a CI group 182 that includes a donor memory 137, a donor file system 188, etc., that supports multiple compute instances 136. For example, a first CI group 182-1 on a worker 181 may include a first donor file system 188-1, a first donor memory 137-1, and a first set of compute instances, such as instances 136-11 and 136-12. Likewise, a second CI group 182-2 on the worker 181 may include a second donor file system 188-2, a second donor memory 137-2, and a second set of compute instances, such as instances 136-21 and 136-22. Each instance 136 within a CI group may access the same donor memory 137 and requests for portions of user data from any of the instances of the CI group may be read or accessed from the donor file system 188 and donor memory 137 for that CI group and stored in the donor memory 137.

For example, the first instance 136-11 and second instance 136-12 of the first CI group 182-1 may make calls for portions of user data through the donor file system 188-1 and the donor file system 188-1 will maintain the portions of the user data on the donor memory 137-1 such that each compute instance 136-11, 136-12 of the CI group 182-1 can quickly access the user data from the donor memory 137-1 of the CI group. As discussed, the donor memory 137-1 may maintain an immutable copy of the user data that is utilized by each of the instances 136-11, 136-12 of the CI group 182-1. Accordingly, when an additional instance 136 is established within the CI group 182-1, the user data needed to execute that instance 136 is already available and ready for use. In comparison, if a write call occurs from one of the instances of the CI group, the write is written to a memory 138 of that instance such that the written information is not shared with other instances of the CI group 182.

Each compute instance may include a compute instance memory, which may be a copy-on-write ("CoW") memory that is utilized to write or store information that is specific to that compute instance. For example, the instance 136-11 may include a compute instance memory 138-11, instance 136-12 may include a compute instance memory 138-12, instance 136-21 may include a compute instance memory 138-21, and instance 136-22 may include a compute instance memory 138-22. Additionally, each compute instance may include a compute instance file system that is specific to that compute instance and that coordinates or controls access to the compute instance memory, such as writes to the compute instance memory. For example, the instance 136-11 may include a compute instance file system 135-11, instance 136-12 may include a compute instance file system 135-12, instance 136-21 may include a compute instance file system 135-21, and instance 136-22 may include a compute instance file system 135-22.

As will be appreciated, there may be any number of CI groups 182 on a worker 181 and any number of compute instances 136 included in each CI group.

To facilitate rapid execution and/or access of user data, each worker 181 may be configured to maintain a set of instances 136 in a "pre-warmed" state, being at least partially configured to begin execution of code. For example, instances may be created on the worker and configured with access to computing resources (CPU, RAM, drive storage, etc.). In accordance with implementations of the present disclosure, it may be impractical or impossible to maintain instances 136 in a fully warmed state for all possible code executions, as executions may be associated with a wide variety of at least partially distinct data sets (e.g., disk images and/or snapshots). Thus, instances 136 may be maintained in a "greatest commonality" for a given user data, such as being provisioned with a set of computing resources common to the user data, being configured to accept an operating system type used by the user data, etc.

On receiving instructions to provision an instance 136 to support execution of user data, the worker 181 may assign the instance to a CI group 182, or create a CI group if one does not exist for the user data, and adjust the configuration of the instance 136 to support that execution or access of the user data. Specifically, and in accordance with implementations disclosed herein, if a CI group for the user data does not exist, the worker 181 may define a CI group 182 for that user data, provision a donor file system 188 and donor memory 137 within the CI group 182 and specific for that user data, and also provision a first instance 136 to that CI group for execution/access of the user data. Likewise, the disk image or snapshot for that user data will be loaded into the donor memory 137, for example in a manner that does not require that disk image or snapshot to be fully transferred to the donor memory 137 and does not require the disk image or snapshot to be transferred to the compute instance memory 138 of the instance 136. Rather, the worker 181 may provide to the donor file system 188 of the CI group with what appears to be full local access to the disk image or snapshot, while retrieving portions of that image or snapshot that are loaded into the donor memory 137 of the CI group 182 in response to a request to read such portions. In one implementation, apparent full local access is provided by a donor file system 188, which illustratively represents a FUSE module executing within the CI group 182 and providing donor file system processes to each compute instance within the CI group. The donor file system 188 may illustratively accept read requests from each instance 136 of the CI group and interact with a local object manager 132 of the worker 181 to obtain the requested data. To facilitate read requests from any of the instances 136 of the CI group 182, the donor file system 188 stores the data obtained from the local object manager 132 in the donor memory 137 and provides the requesting instance access to the donor memory, but does not write the data to the compute instance memory 138 of the instance 136.

The local object manager 132, in turn, represents code executing on the worker 181 and configured to provide the donor file system 188 of each CI group with access to the requested portions. For example, the local object manager 132 may obtain a request to access a portion of the user data, and if the portion is not available within the L1 cache 144, retrieve that portion from the L2 cache 105 and/or the object storage system 190. On retrieving the portion, the portion may be placed within the L1 cache 144. In one implementation, the L1 cache 144 may represent a memory-mapped file on a file system of the worker 181, which may be stored for example on high speed storage of the worker 181 to facilitate rapid access. For example, the L1 cache 144 may be stored wholly or partly within RAM of the worker 181, and wholly or partly within other high speed storage (e.g., a solid state drive (SSD), 3D XPOINT memory, flash memory, etc.). The L1 cache 144 may be sized such that it can hold hundreds, thousands, or millions of portions. For example, individual portions may be 512 kb objects, while the L1 cache 144 is hundreds of gigabytes or terabytes in size. On retrieving a requested portion, the local object manager 132 may place the portion into the L1 cache 144 and return to a requesting donor file system 188 a pointer to a location within the L1 cache 144 holding the portion. The donor file system 188 may then read the portion from the location, store the portion in the donor memory 137 of the CI group, thus enabling satisfaction of a read request from a compute instance 136 of the CI group and generating an immutable copy of the portion in the donor memory 137 of the CI group that can be accessed by any instance 136 within the CI group.

In one implementation, each CI group 182 is associated with a distinct donor file system 188 and donor memory 137 within its respective CI group 182 and each instance 136 within that CI group 182 can read from the donor memory. In comparison, each worker 181 may include a single local object manager 132 and L1 cache 144. Accordingly, multiple CI groups 182 and included instances 136 may gain shared access to the L1 cache 144. As noted above, multiple data sets of different user data may overlap with respect to at least some portions. Thus, shared access to the L1 cache 144 can significantly reduce "cache misses" by enabling a portion retrieved based on a request from one CI group 182 to also service requests from another CI group 182. For example, where two CI groups, such as CI groups 182-1 and 182-2, utilize the same operating system but execute different user data and/or are assigned to different users, it is likely that a significant percentage of their respective disk images—the portion storing the operating system—overlap. Thus, portions of the disk image would also be expected to overlap, and executions of the two sets of user data may effectively share access to those portions within the L1 cache 144. In comparison, because each instance 136 within a CI group 182, such as instances 136-11 and 136-12 within the same CI group 182-1 are assigned to the same user and execute the same user data, there will be significant overlap in the respective disk images/portions accessed by those instances and execution of those instances may share access to the donor memory 137-1 of that CI group 182-1. Likewise, if another instance is added to the CI group 182-1 it immediately has access to the portions of the disk image already loaded into the donor memory 137-1 in response to requests from other instances of the CI group 182-1.

In some implementations, the L1 cache 144 may be "seeded" with commonly used portions prior to execution of any user data, such as by storing within the L1 cache 144 portions associated with commonly used operating systems, runtimes, libraries, etc. In some instances, these seeded portions may be exempted from cache eviction policies that might otherwise be applied to the L1 cache 144 by the local object manager 132.

Each donor memory 137 may be maintained as "copy-on-read" ("CoR") such that an instance 136 is unable to modify the portion of user data stored in the donor memory. In comparison, the instance memory 138 assigned to each instance 136 may be maintained as a CoW memory so that write commands from an instance are written to the corresponding instance memory of the instance and not to the donor memory.

The donor file systems 188-1, 188-2 and local object manager 132 may communicate via any number of known intra-device techniques. For example, each donor file system 188 may, on initialization, create a Unix socket connection to the local object manager 132 to facilitate communication.

In addition to the L1 cache 144 on a given worker 181, the local object manager 132 of FIG. 1 also has access to a level two cache ("L2 cache") 105, which may maintain block storage volumes 116. The block storage volumes 116 may be created from snapshots stored in the object storage buckets 111 hosted on the object storage system 190. The L2 cache 105 and block storage volumes 116 are discussed further below.

In some implementations, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A micro VM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped-down version of an OS kernel (e.g., having only the required OS components and their dependencies) to reduce boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, micro VM metadata service (MMDS), and VirtIO device emulated network and block devices. In addition, there are one or more vCPU threads (one per guest CPU core).

Although some implementations of the present disclosure describe a compute instance as being a virtual machine, a compute instance, as used herein, may refer to any one of a virtual machine instance, a bare-metal instance, a microVM, a physical machine, a container, a node, an offload card, or another unit of compute capacity configurable to execute user data. Such a compute instance may reside within the serverless code execution system 110 or within an on-premises environment outside the serverless code execution system 110.

In addition, the system 110 includes a number of components for facilitating distribution of calls to execute a user data from frontends 120 to particular instances 136. For example, the serverless code execution system 110 includes one or more worker managers 122 configured to manage execution environments (e.g., virtual machine instances) hosted by workers 181 among a worker fleet 180. The worker managers 140—each of which are illustratively implemented as physical or virtual-on-physical devices— illustratively "lease" particular instances 136 within the fleet 180, thus gaining operational control to, for example, assign the instance to a CI group and instruct the virtual machine instance to access user data corresponding to the CI group to which the instance is assigned. Thus, on receiving a call for user data, a frontend 120 may distribute the call to a worker manager 122, which may identify a CI group that accesses the user data, identify a currently-leased instance 136 within that CI group, and cause the instance 136 to access the user data.

If a worker manager 122 does not currently have a CI group for the user data and/or have a leased instance within a CI group 182 for the user data, the worker manager 122 can contact a placement service 160 to request creation of a CI group 182 (along with a donor memory and donor file system) and request a lease on an additional instance 136 for that CI group. The placement service 160, in response to the request may establish the CI group and grant to the worker manager 122 leases to individual instances 136. Illustratively, the placement service 160 may maintain state information for CI groups and/or instances 136 across the fleet 180, as well as information indicating which manager 122 has leased a given instance 136. When a worker manager 122 requests a lease on an additional instance 136, the placement service 160 can identify an appropriate instance 136 (e.g., warmed with software and/or data required to support a call to implement a user data) and grant to the manager 122 a lease to that instance 136. In the case that such an instance 136 does not exist, the placement service 160 can instruct a worker 181 to create such an instance 136 (e.g., by creating an instance 136 or identifying an existing unused instance 136, storing an appropriate data manifest for a required disk image, snapshot, etc., in a CI group 182 of that instance 136, and configuring the donor file system 188 to provide access to the required data set) thereafter grant to the worker manager 122 a lease to that instance 136, thus facilitating execution.

Attachment between a volume and an instance refers to the establishment of a connection between a client of the instance and the volume. This connection may be referred to as a "lease" in some implementations, and it enables an instance to view the volume as if it were a local storage drive, even though the volume and instance may be hosted on different physical machines and communicating over a network.

The L2 cache 105 provides persistent data storage in the form of volumes 116, each of which represents a virtualized, network accessible block-storage device (e.g., a virtual "hard disk"). The L2 cache 105 and associated control plane functionality can provide an elastic L2 cache of the serverless code execution system 110. L2 caches can be referred to as a cloud disk service, managed disk service, storage area network service, persistent disk service, or block volume service, in various implementations. Data of volumes 116 may be encrypted or unencrypted. The L2 cache 105 may include one or more servers on which data is stored as blocks. A block is a sequence of bytes or bits, usually containing some whole number of records, having a maximum length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 KB, 256 kB, 512 kB, or larger, depending upon the implementation. The snapshots described herein may include any number of such blocks. The size of a snapshot may vary, depending for example upon the size of the user volume for which the snapshot is created.

Block storage volumes 116, which can be treated as an individual hard drive ranging for example from 1 GB to 1 terabyte TB (or more) in size, are made of one or more blocks stored on the L2 cache 105. Although treated as an individual hard drive, it will be appreciated that a volume may be stored as one or more virtualized devices implemented on one or more underlying physical host devices. Volumes 116 may be partitioned a small number of times (e.g., up to 16) with each partition hosted by a device of the system 110 that has the ability to transfer data at around 1 GB per second ("Gbps") in some implementations. These volumes 116 provide persistent, dedicated storage that can be attached to particular compute instances of the system 110. Each volume may be attached to a single compute instance running on a compute server, and can be detached from that compute instance and re-attached to another. The L2 cache 105 may have built-in redundancy for volumes 116 by replicating the volume across multiple servers within an availability zone, which means that volumes will not fail if an individual drive fails or some other single failure occurs.

Figure 2:
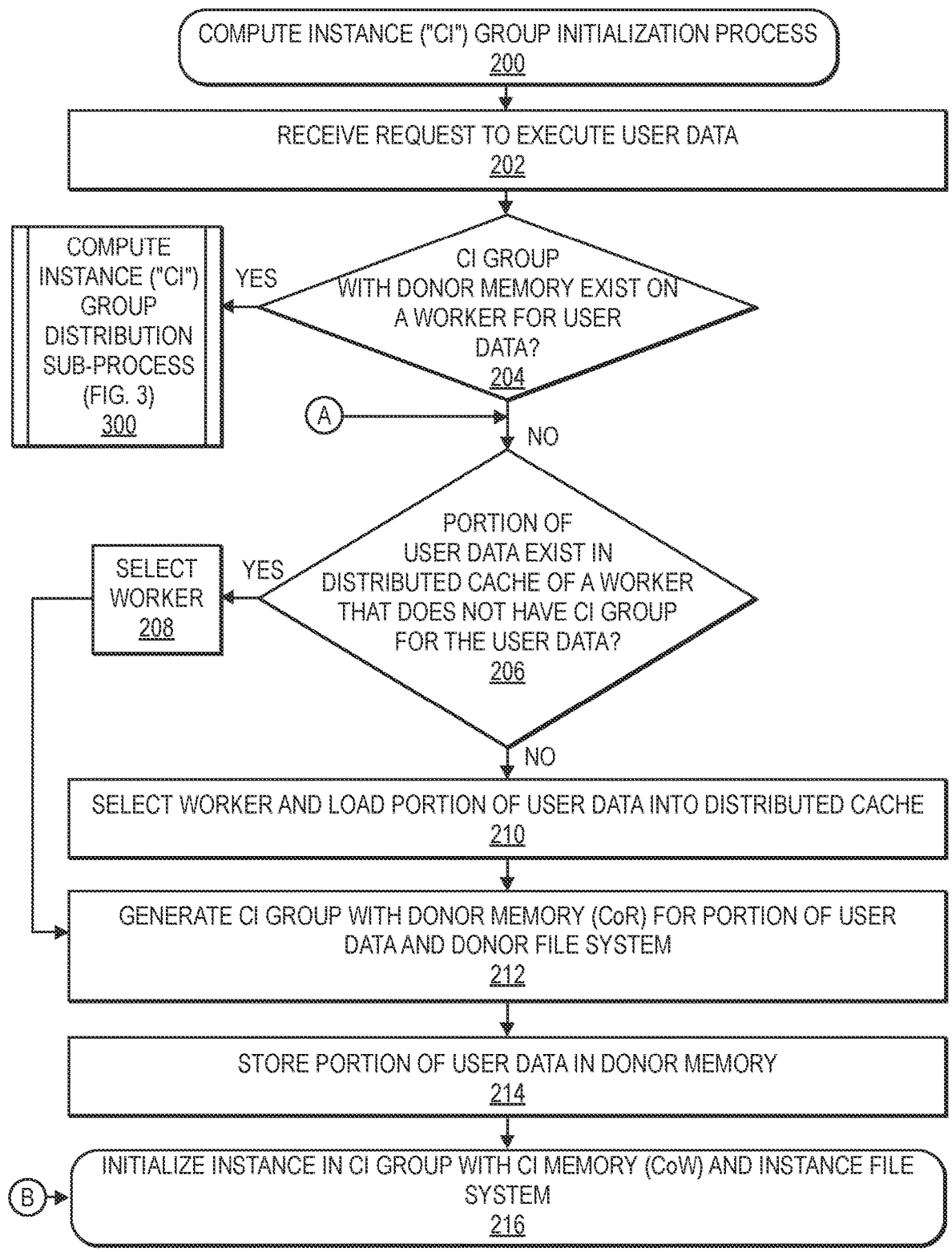
FIG. 2 is an example compute instance group initialization process, in accordance with implementations of the present disclosure.

FIG. 2 is an example compute instance group initialization process 200, in accordance with implementations of the present disclosure. The example process 200 may be performed each time a request or call is received for user data. One or more components of the serverless code execution system 110, discussed with respect to FIG. 1, may perform all or portions of the example process 200.

The example process 200 begins upon receipt of a request to execute user data that has previously been provided to the serverless code execution system 110, for example as a disk image, as in 202. As discussed above, all or portions of user data and/or snapshots of executables of the user data may be stored in the L2 cache 105 and/or the object storage system 190 of the system 110. Likewise, in some instances, portions of the user data may reside in one or more L1 caches 144 of one or more workers 181.

Upon receipt of the request, a determination is made as to whether a CI group with donor memory exists on a worker for the user data, as in 204. For example, if a previous request has been received to execute the user data, the example process 200 may have already been performed and a CI group generated for the user data.

If it is determined that a CI group already exists for the user data, the CI group distribution sub-process 300 (FIG. 3) is performed. The CI group distribution sub-process 300 is discussed further below with respect to FIG. 3.

If it is determined at decision block 204 that a CI group for the user data does not already exist on a worker, if it is determined in the CI group distribution sub-process 300 that there is not a minimum number of CI groups for the user data established on different workers (decision block 302 of FIG. 3), or if it is determined in the CI group distribution sub-process 300 that there is not a CI group with less than a maximum number of instances for the user data (decision block 304 of FIG. 3), a determination is made as to whether a portion of the user data exists in a distributed cache of a worker that does not have a CI group for the user data, as in 206.

If it is determined that a portion of the user data exists in a distributed cache of a worker, that worker is selected, as in 208. However, if it is determined that a portion of the user data does not already exist in the distributed cache of a worker, a worker may be selected and a portion of the user data loaded into the distributed cache of the worker, as in 210. In some implementations, decision block 206 may be omitted or optional, and if it is determined that a new CI group is to be established on a worker, a worker may be selected based on criteria other than whether a portion of the user data exists in the distributed cache of the worker. For example, a worker may be selected based on, for example, the total load on different workers of the worker fleet, the compute capacity of workers of the fleet, the computing resources of different workers of the worker fleet, the computing resources needed for execution of the user data, randomly, etc.

Regardless of how a worker is selected, upon worker selection, a CI group is established for the user data, a donor memory assigned within the worker space, and a donor file system assigned to manage the donor memory is established, as in 212. For example, and as discussed above, the worker managers 122 and/or placement service 160 may establish a CI group within a worker, allocate computing resources and memory to the CI group, define a donor memory to the CI group, and generate a donor file system for the CI group. The donor memory may be specified as a CoR memory such that portions of the user data may be copied into the donor memory when requested by or on behalf of an instance associated with the CI group.

Upon generation of the CI group with the donor memory and corresponding donor file system, the donor file system may obtain from the distributed cache of the worker and/or from the L2 cache or the object storage system of the serverless code execution system, a portion or all of the user data and/or a snapshot of a portion or all of the user data and store the same in the donor memory, as in 214. For example, the donor file system may obtain a portion of a snapshot that may be used to quickly execute a portion of the user data that will most likely be called for execution.

Finally, an instance may be leased, assigned to the CI group, and initialized to execute the requested user data, as in 216. In such an example, the instance may be initialized to function as if the donor memory is local to the instance and read the portions of the user data directly from the donor memory. If the instance makes a read request for a portion of the user data that is not in the donor memory, the donor file system of the CI group will obtain the requested portion of the user data, store it in the donor memory, and the instance will access the portion of the user data directly from the donor memory, without copying the user data to an instance memory of the instance. Likewise, the instance may be initialized to include an instance memory and an instance file system that are specific to the instance and that instance memory may be specified as a CoW memory, as in 216. In such an example, if the user data executing on the instance makes a write request, the write is made to the instance memory of the instance and not to the donor memory. As such, the instance may access an immutable copy of the user data directly from the donor memory, as can other instances of the CI group, and at the same time write data to an instance memory of the instance such that the written data is only accessible to that instance.

Figure 3:
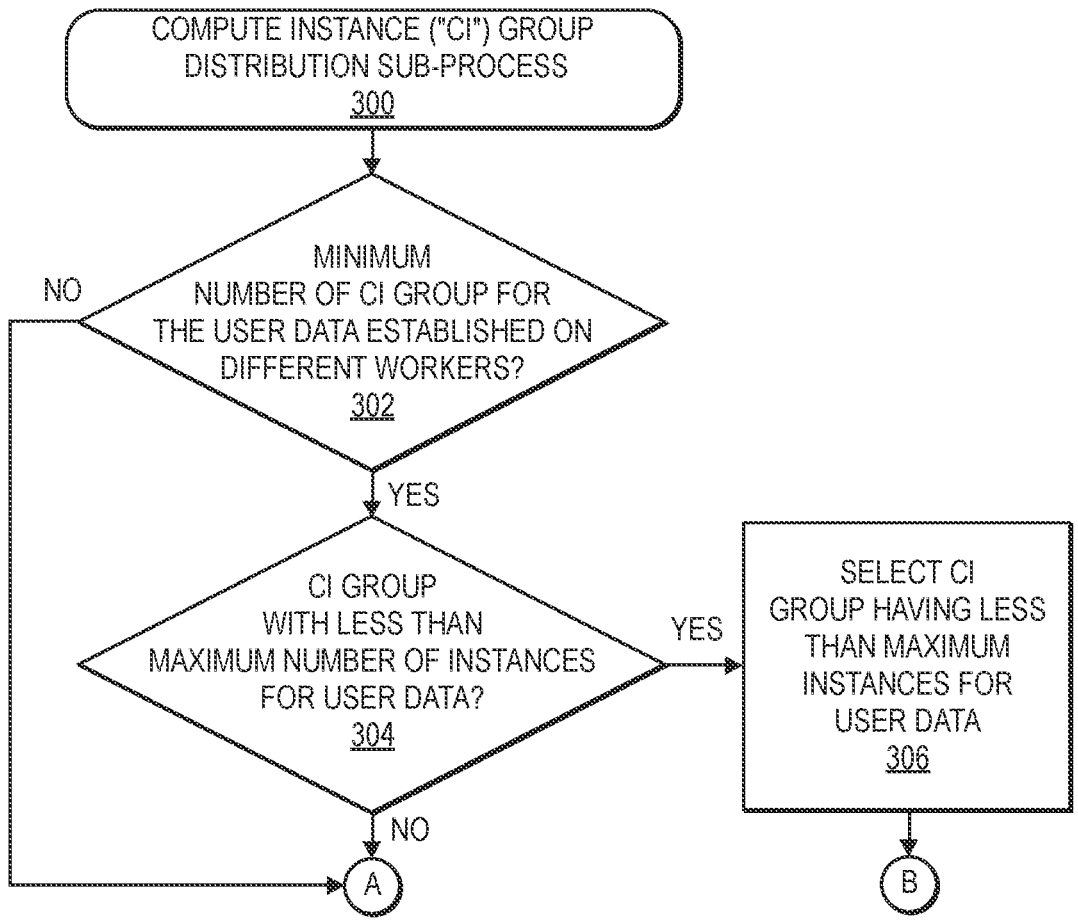
FIG. 3 is an example compute instance group distribution sub-process, in accordance with implementations of the present disclosure.

FIG. 3 is an example compute instance group distribution sub-process 300, in accordance with implementations of the present disclosure. As discussed above, the CI group distribution sub-process 300 may be performed in response to a determination that there is a CI group on a worker for the user data that is to be executed (decision block 204 of FIG. 2).

The example sub-process 300 begins by determining if a minimum number of CI groups for the user data has been established on different workers of the worker fleet, as in 302. The minimum number may vary for different user data, different worker fleets, different requirements, and may be changed based on overall compute capacity of the serverless code execution system, etc. In some implementations, the minimum number may be one. In other implementations, to distribute the user data across different workers of the worker fleet, thereby decreasing the risk of a single point of hardware failure and/or oversubscription on a single worker, the minimum number of workers may be higher (e.g., four).

If it is determined that a minimum number of CI groups for the user data has been established on different workers, a determination is made as to whether there is a CI group that has less than a maximum number of instances for the user data, as in 304. Like the minimum number of CI groups of the code distributed across different workers, a maximum number of instances may be defined for each CI group. The maximum number may vary for different user data, different workers, different worker fleets, different CI groups, the current or anticipated compute demand on a worker, etc. In some implementations, the maximum number of instances that may be assigned to a CI group is fifty. In other implementations, the maximum number of compute instances may be higher or lower.

If it is determined that there are one or more CI groups for the user data with less than the maximum number of instances, one of the CI groups is selected, as in 306. If there are multiple CI groups with less than the maximum number of instances, a CI group may be selected at random, in a round-robin fashion, based on the current or expected compute demand on the worker, etc. Upon selection of the CI group, an indication of the CI group is returned to block 216 of FIG. 2.

If it is determined at decision block 302 that there is not a minimum number of CI groups for the user data established on different workers (i.e., a CI group needs to be established on a worker for the user data) or if it is determined at decision block 304 that all of the existing CI groups for the user data have a maximum number of instances (i.e., a CI group needs to be established on a worker for the user data), the example sub-process 300 returns to decision block 206 of FIG. 2 where an indication that a CI group needs to be created on a worker for the user data.

Figure 4:
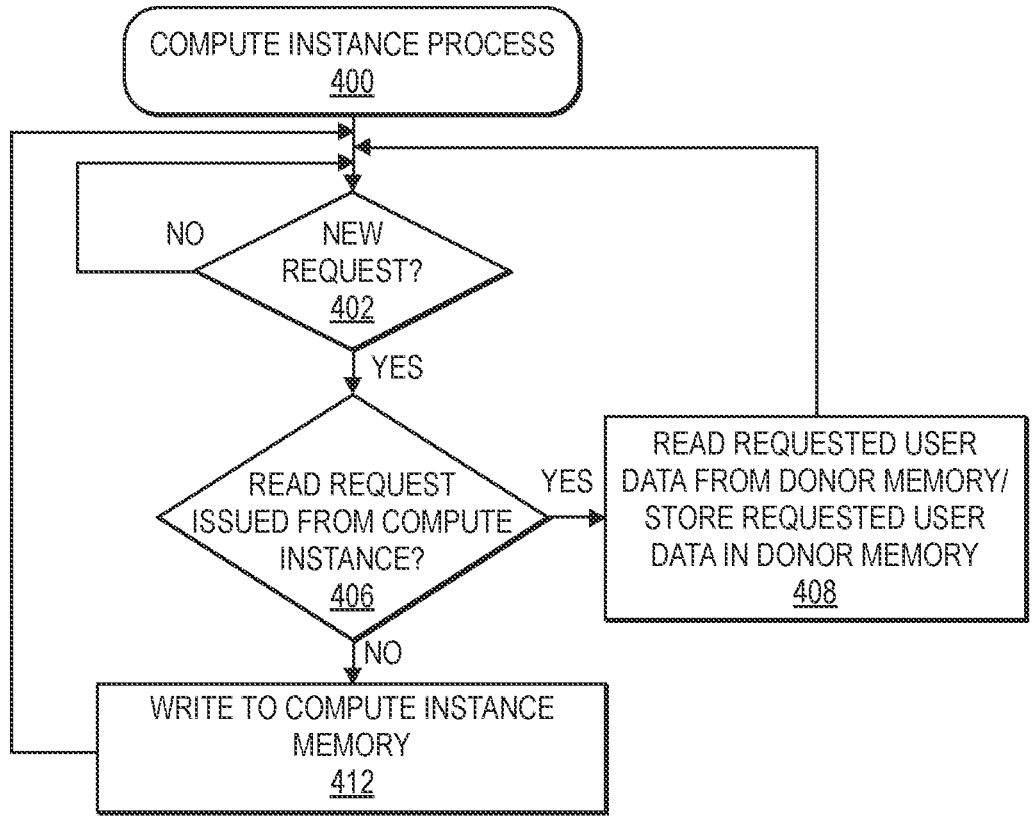
FIG. 4 is an example compute instance process, in accordance with implementations of the present disclosure.

FIG. 4 is an example compute instance process 400, in accordance with implementations of the present disclosure. The example process 400 may be performed by or for any compute instance of the serverless code execution system discussed above with respect to FIG. 1.

The example process 400 begins by determining if a new request, also referred to herein as a fault or memory fault, has been received for an instance that has been leased and initialized to execute the user data, as in 402. If a new request has not been received, the example process remains at decision block 402.

If it is determined that a new request has been received, a determination is made as to whether the request is a read request, as in 406. If the request is a read request, the requested user data is read from the donor memory of the CI group in which the instance is executing as if the requested user data was local to the instance, as in 408. Alternatively, if the requested user data does not already reside in the donor memory, the donor file system of the CI group will obtain the requested user data from the L1 cache of the worker or, if the portion of the user data is not in the L1 cache, obtain the portion of the user data from the L2 or L3 cache of the system. Once obtained, the portion of the user data is stored in the donor memory such that the instance can read the portion of the user data directly from the donor memory, without copying the user data to an instance memory of the compute instance.

If it is determined at decision block 406 that the request is not a read request, meaning that the request is a write request, the operation is performed and the write is made to an instance memory of the compute instance, as in 412. As discussed above, by writing to a memory that is specific to the compute instance, security is maintained for the compute instance.

After completing the request, for example by reading from the donor memory (406) or writing to the instance memory (412), the example process 400 returns to decision block 402 and awaits a new request.

Figure 5:
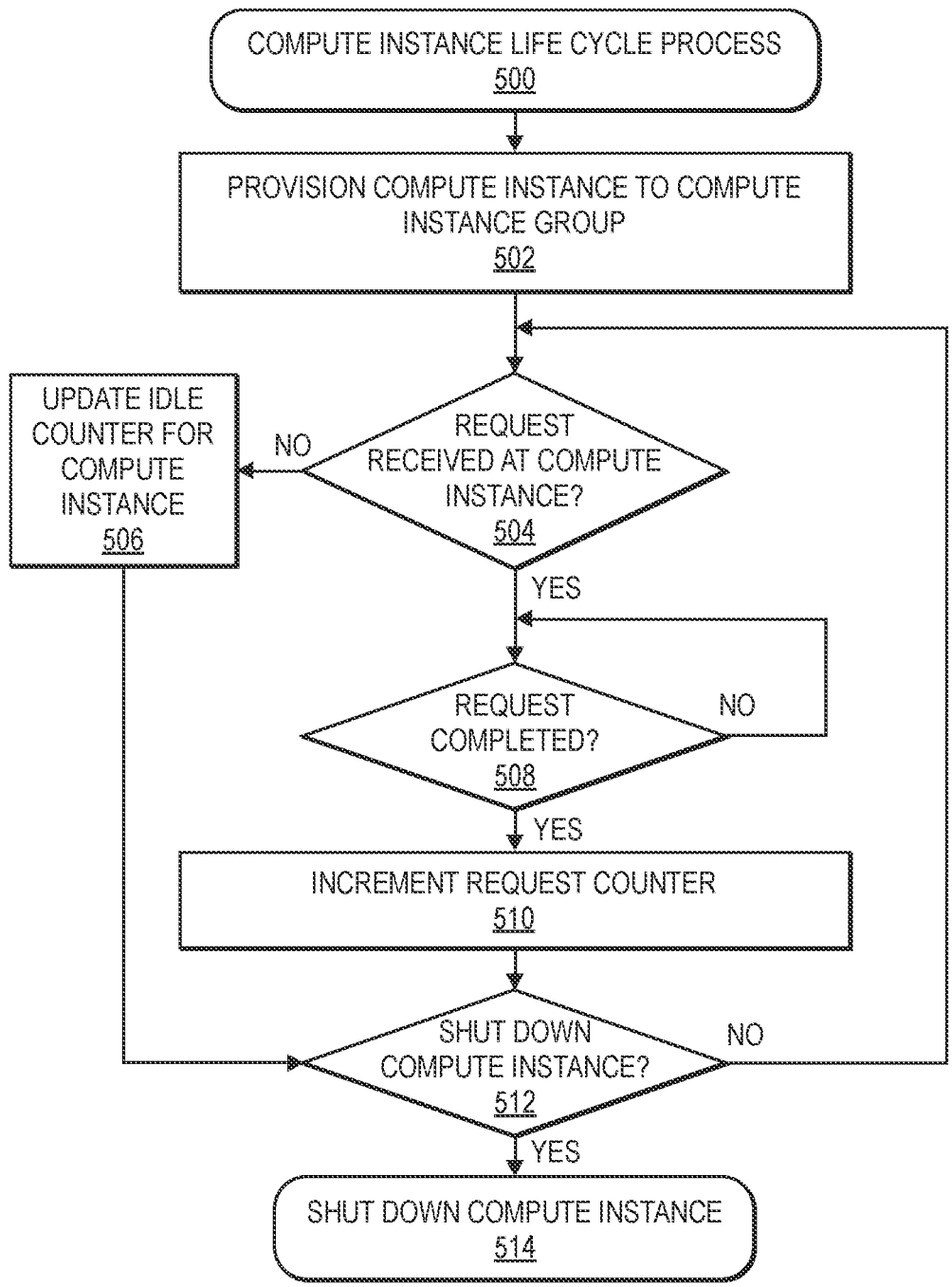
FIG. 5 is an example compute instance life cycle process, in accordance with implementations of the present disclosure.

FIG. 5 is an example compute instance life cycle process 500, in accordance with implementations of the present disclosure. The example process 500 may be performed by one or more of the components of the serverless code execution system discussed above with respect to FIG. 1. For example, the frontends and/or the worker managers may perform some or all of the example process 500.

The example process begins upon provisioning of a compute instance within a CI group, as in 502. As discussed, instances can be quickly provisioned within a CI group because the CI group has donor memory that includes user data that can be accessed by each instance within the CI group. Accordingly, instances can be quickly provisioned and, just as quickly, shut down while the donor memory and CI group remains.

Upon provisioning of an instance within the CI group, a determination may be made as to whether a request is received at the instance, such as a request from a user device or a request from an auxiliary service, as in 504. If no request has been received, an idle counter for the compute instance may be updated, as in 506, indicating that a request has not been received at the compute instance. If it is determined that a request has been received at the compute instance and the compute instance has begun processing the request, a determination is made as to whether the request has been completed by the compute instance, as in 508. As is appreciated, a request to a compute instance from a user device or auxiliary service may result in several internal requests within the compute instance that are performed to complete the request received from the user device or the auxiliary device.

If it is determined that the request from the user device/auxiliary device has not been completed, the example process 500 may remain at decision block 508 until the request is completed by the instance. If it is determined at decision block 508 that the request has been completed by the compute instance, a request counter for the compute instance may be incremented to indicate that the compute instance has completed a request from the user device or auxiliary service, as in 510. The request counter may indicate a number of requests from the user device or auxiliary service that have been completed by the compute instance.

After incrementing the request counter (510) or after updating the idle counter (506), a determination may be made as to whether the compute instance should be shut down, as in 512. In some implementations, an instance may be shut down after it performs a single request received from a user device or auxiliary service, thereby removing any concern for security attacks on the instance, such as side channel attacks. In other implementations, a maximum number of requests may be established and the instance shut down when the request counter reaches the maximum. Alternatively or in addition thereto, a maximum idle time may be defined for instances and if the instance remains idle for the maximum idle time, the instance may be shut down. As will be appreciated, the maximum request count and/or the maximum idle time may vary by user, by user data, by CI group, by instance, and/or based on any other selected criteria.

If it is determined that the instance should be shut down, the instance is shut down, as in 514. If it is determined that the instance should not be shut down, the example process 500 returns to decision block 504 and continues.

Figure 6:
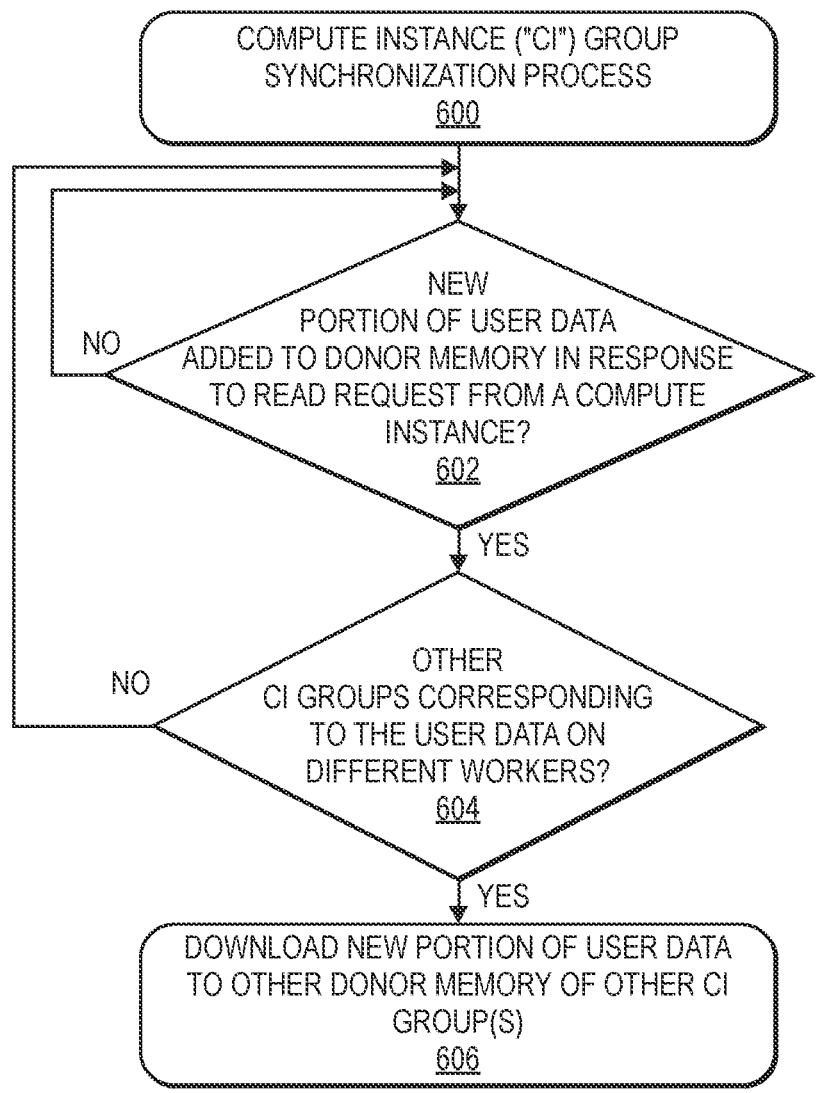
FIG. 6 is an example compute instance groups synchronization process, in accordance with implementations of the present disclosure.

FIG. 6 is an example compute instance groups synchronization process 600, in accordance with implementations of the present disclosure. As discussed below, in some implementations, CI groups for the same user data may be distributed across different workers. In such an example, as requests from different instances in the CI groups are received and portions of the user data loaded into donor memory of one CI group for the code, the example process 600 may be performed to synchronize the donor memory of the other CI groups that are executing the same user data so that when an instance from another CI group requests that portion of the user data it is already stored in the donor memory of the respective CI group and immediately available.

The example process 600 begins by determining if a new portion of the user data has been added to a donor memory of a CI group corresponding to the user data, as in 602. If a new portion of the user data has not been added to the donor memory of a CI group, the example process remains at decision block 602 and continues monitoring for an addition of a portion of the user data to the donor memory.

If it is determined that a new portion of the user data has been added to the donor memory of a CI group corresponding to the user data, a determination is made as to whether there is another CI group on another worker corresponding to the same user data, as in 604. If it is determined that there are one or more other CI groups corresponding to the user data on other workers of the worker fleet, the new portion of the user data is loaded into at least one of the distributed caches of the worker so that it can be quickly accessed by the donor file system of that other CI group when that portion of the user data is requested and/or that portion of the user data is loaded into the donor memory of the other CI group(s) corresponding to the user data, as in 606. If it is determined at decision block 604 that there are no other CI groups on other workers corresponding to the same user data, the example process 600 returns to block 602 and continues.

Figure 7:
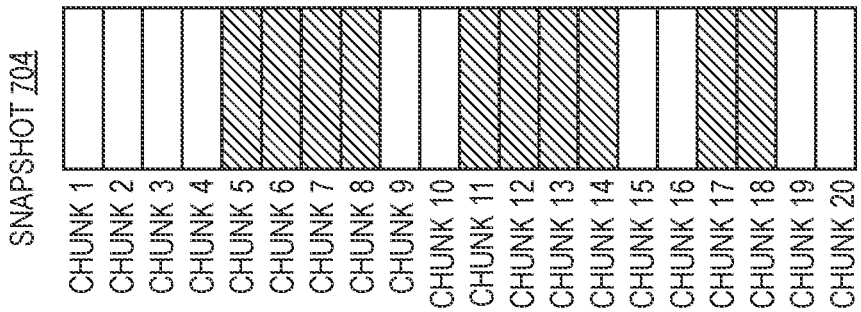
FIG. 7 illustrates an example arrangement of chunks in a snapshot and a corresponding load order document, in accordance with implementations of the present disclosure.

FIG. 7 depicts an example arrangement of chunks 1-20 in a snapshot 704 and a corresponding load order document 702, in accordance with implementations of the present disclosure.

In FIG. 7, the load order document 702 indicates that chunks 5-8, 17-18, and 11-14 are prioritized and should be pre-loaded (e.g., pre-warmed, pre-fetched, or pre-faulted, as described here) onto the memory or cache from the snapshot 704 (e.g., chunk 5, chunk 6, chunk 7, chunk 8, chunk 17, chunk 18, chunk 11, chunk 12, chunk 13, and then chunk 14). The prioritized chunks are highlighted in FIG. 7. In some implementations, after all the prioritized chunks have been loaded, the remaining chunks may be loaded onto the relevant storage (e.g., cache or memory described herein) in a sequential order. Alternatively, in other implementations, no other chunks would be loaded onto the relevant storage after all the prioritized chunks have been loaded (e.g., the chunks whose load order is specified in the load order document).

As shown in FIG. 7, the load order document 702 also includes the generation number indicating the number of times the load order document 702 has been updated (e.g., for a particular user data). For example, if the generation number is zero, that means the load order document 702 has not been updated based on actual usage and includes default values generated by the system 110 based on which portions of the snapshot are likely to be used during the execution of the user data associated with the load order document 702. Each invocation of the user data may result in additional information about which portions of the snapshot (e.g., which data chunks of the snapshot, or which files within the snapshot), and the additional information may be used to update the load order document 702 (e.g., specify new chunks, rearrange the order of the specified chunks, and/or remove existing chunks). Additional details regarding how the pre-warming, pre-fetching, and/or pre-faulting may be performed differently based on the generation number are described in greater detail below with reference to FIGS. 8A-10.

"Snapshots," as used herein, represent point-in-time backups of data volumes, user data, etc. Generally, when a snapshot is created and stored, the snapshot is partitioned into a plurality of logical partitions or objects that are stored on object storage servers. During the initial creation of the snapshot, a "table of contents" or "manifest" file may be written to the object storage servers. A snapshot manifest can be arranged as an ordered list of block indices (e.g., logical blocks of a block storage device forming the basis of the snapshot) and can identify the object on the object storage service that holds data corresponding to that block. A manifest can include additional data regarding each block such as metadata relating to the storage location of the block and a snapshot ID. In one example, snapshots are implemented as incremental records of data within a volume. Illustratively, when the first snapshot of a volume is taken, all blocks of the volume that contain valid data are copied as one or more objects to the object storage servers, and then a manifest file is written to the object storage servers that includes a record of the one or more objects, as well as the blocks of the volume to which each of the one or more objects correspond. Due to the use of incremental snapshots, when the subsequent snapshots are taken of the same volume (user data, etc.), only the blocks that have changed since the first snapshot need be copied to the object storage servers, and the table of contents or manifest file can be updated to point to the latest versions of each data block (or a second table of contents or manifest file can be created, enabling the initial table of contents or manifest file to remain as a record of a prior version of the volume). An initial snapshot can be used to reconstruct the volume/user data at the time of the initial snapshot, or snapshots from subsequent time points can be combined together or with the initial snapshot to reconstruct the entire volume at any individual subsequent point in time. In this way snapshots can serve as both incremental backups and a full backup of a given volume/user data.

Figure 8A:
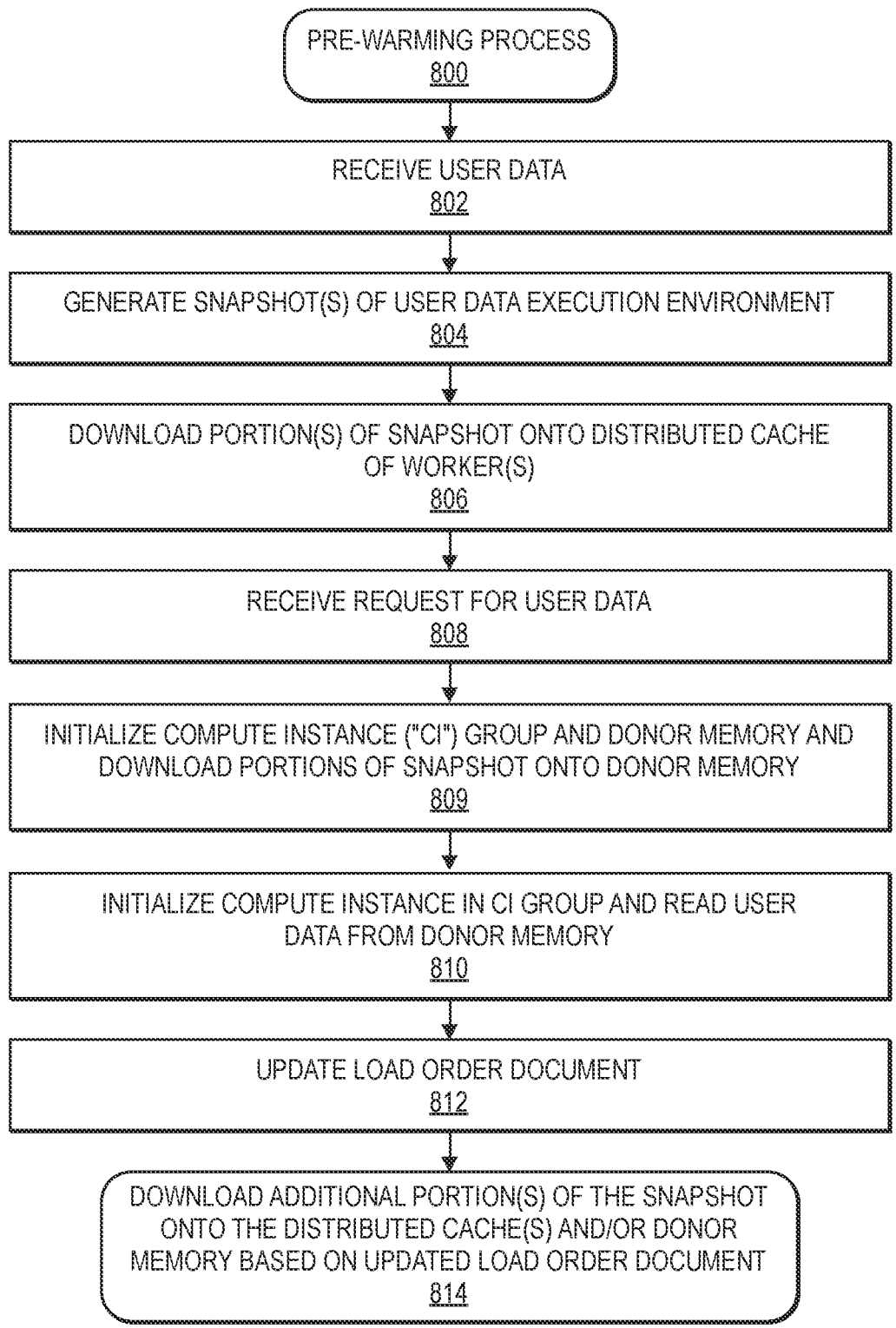
FIG. 8A is an example pre-warming process, in accordance with implementations of the present disclosure.

FIG. 8A depicts an example pre-warming process 800 to pre-warm a distributed cache and/or a donor memory, in accordance with implementations of the present disclosure. The example process 800 may be carried out, for example, by the local object manager 132, by the donor file system 188 of a CI group, and/or one or more other components of the serverless code execution system 110 described herein.

The example process 800 begins upon detection of a user data publication, as in 802. For example, when a user creates a new user data or makes changes to an existing user data, the newly saved user data may be published and the published user data may be used to generate a snapshot that can be used to pre-warm the distributed cache and/or a donor memory accessible by a compute instance that can later be used to execute the user data when such execution is requested. In some implementations, snapshot generation is automatically performed in response to detection of a user data publication. In other implementations, the snapshot generation process may be performed in response to a user request to execute the user data.

Upon receipt of the published user data, one or more snapshots of the code execution environment of the user data are generated, as in 804. For example, a compute instance may be identified and the user data executed on the instance, thereby creating the code execution environment that can be captured in the snapshot. The code execution environment may include one or more storage volumes, memory, state files associated with the compute instance on which the user data is executed, metadata indicating one or more parameters (e.g., such as those described with reference to FIG. 7) associated with the code execution environment, and the like. In some implementations, the snapshot is generated based on the user data and/or an existing execution environment in which the user data can be executed (e.g., without actually executing the user data upon detecting the publication of the user data at block 802).

One or more portions of the snapshot may then be downloaded onto a distributed cache of one or more workers such that the snapshot is accessible by a donor file system of a CI group so that one or more compute instances of that CI group can be used to execute the user data associated with the snapshot if and when such a request to execute the user data is received, as in 806.

At some time after snapshot generation, a request to execute the user data is received, as in 808. For example, the request may indicate the identity of the user data and one or more arguments or parameters to be used to execute the user data.

In the example illustrated with respect to FIG. 8A, upon receipt of a first request to execute the user data, a CI group with an included donor memory and donor file system for the user data is initialized on a worker and portions of the snapshot of the user data are downloaded from the distributed cache into the donor memory of the CI group, as in 809. As discussed above, if this is the first request to execute the user data or if it is determined that an additional CI group is to be generated for the user data, the CI group, with an included donor memory and donor file system is initialized on a worker. In comparison, as discussed above, if a CI group already exists for the user data, block 809 has already been completed.

After initialization of the CI group, a compute instance is leased, assigned to the CI group, initialized, and utilized to execute the user data using the snapshot included in the donor memory, as in 810. For example, at least one or more portions of the user data (e.g., one or more initial portions or one or more portions usable to set up the execution environment) executed in response to a user request (e.g., at block 810) may be different from those executed to create the code execution environment to be captured in the snapshot (e.g., at block 804). In some implementations, at block 804, only the initialization portion of the user data may be executed, and at block 810, based on the some or all of the code execution environment or the initialization data being available in the distributed cache and/or donor memory of a CI group (or some other storage accessible by the compute instance being used to execute the user data), the initialization portion of the user data may be skipped and only the remaining portions of the user data may be executed. In other implementations, at block 804, the entire initialization portion of the user data may be executed, and at block 810 based on some or all of the code execution environment or the initialization data being available in the distributed cache and/or the donor memory of the CI group (or some other storage accessible by the compute instance being used to execute the user data), only a portion of the initialization portion of the user data may be executed and the non-initialization portion of the user data may be executed. In yet other implementations, the portions of the user data executed at block 804 and at block 810 may be identical.

After execution of some or all of the user data at block 810, the load order document associated with the snapshot may be updated to include data or chunks of the snapshot actually used during the execution of the user data, as in 812. In some implementations, such data or chunks may be placed ahead of (or indicated as having higher priority than) other data or chunks already in the load order document but was not accessed during the execution of the user data at block 810. For example, the load order document may be used to load chunks of a snapshot into other distributed caches of other workers and/or into other donor memory of other CI groups for the user data. By updating the load order document, the priority of chunk order loading is improved.

Additional portions of the snapshot may then be downloaded onto the distributed cache and/or donor memory based on the updated load order documents, as in 814. In some implementations, block 814 is performed asynchronously and not in response to block 812. More specifically, in some cases, the data/chunks actually accessed during the execution of the user data may have already been added to the distributed cache and/or the donor memory initialized for the CI group to facilitate that access and such data/chunks, even if newly added to the load order document at block 812, may not need to be added to the distributed cache and/or donor memory as they have already been downloaded. Thus, it may be determined, on an ongoing basis based on the most recent version of the load order document at the time, whether additional portions of the snapshot need to be downloaded onto the distributed cache and/or donor memory and download such portions onto the distributed cache and/or donor memory as needed. In other implementations, block 814 is performed in response to block 812.

Figure 8B:
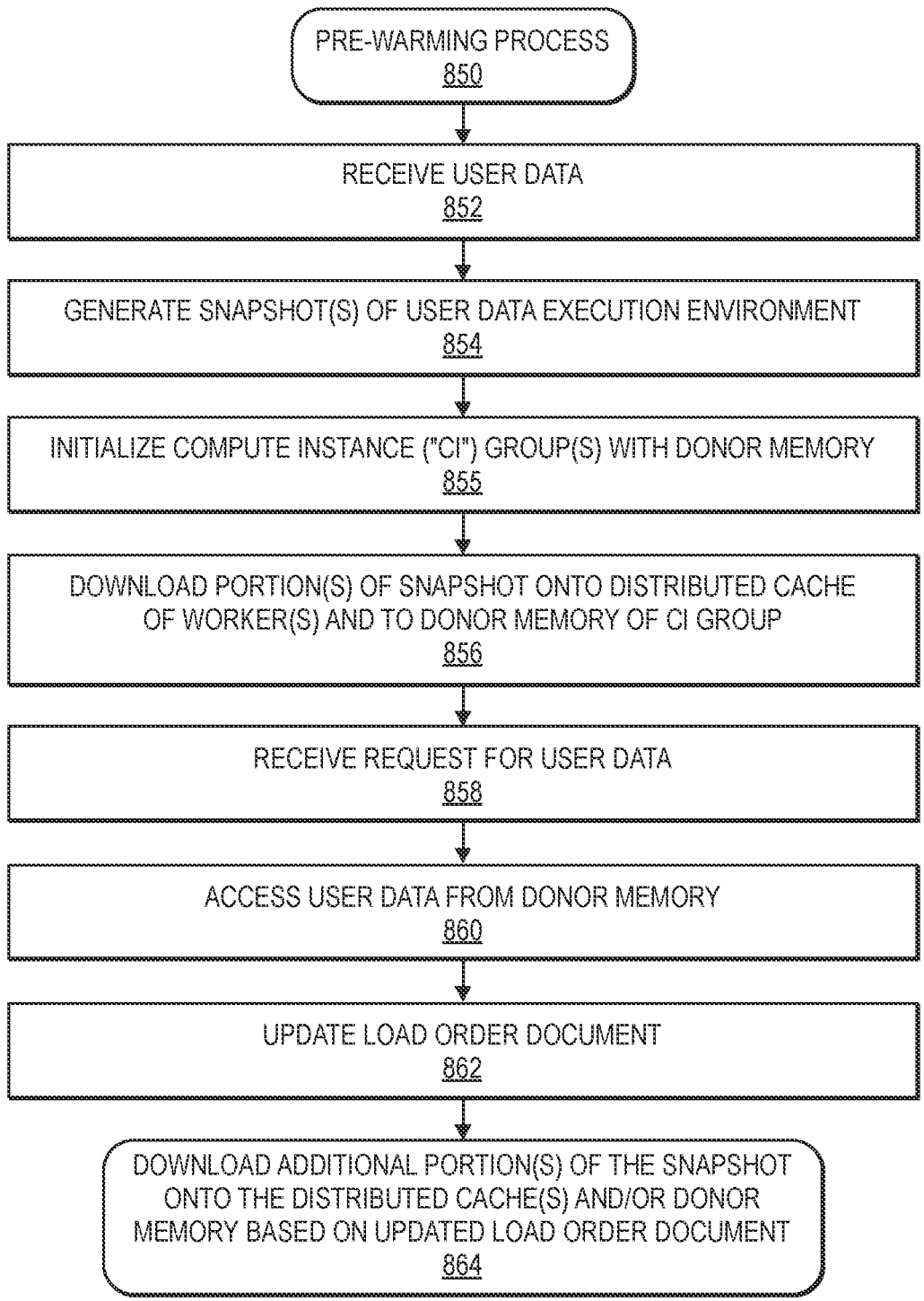
FIG. 8B is another example pre-warming process, in accordance with implementations of the present disclosure.

FIG. 8B depicts another example pre-warming process 850 to pre-warm a distributed cache and/or a donor memory, in accordance with implementations of the present disclosure. The example process 850 may be carried out, for example, by the local object manager 132, by the donor file system 188 of a CI group, and/or one or more other components of the serverless code execution system 110 described herein.

The example process 850 begins upon detection of a user data publication, as in 852. For example, when a user creates a new user data or makes changes to an existing user data, the newly saved user data may be published and the published user data may be used to generate a snapshot that can be used to pre-warm the distributed cache and/or a donor memory accessible by a compute instance that can later be used to execute the user data when such execution is requested. In some implementations, snapshot generation is automatically performed in response to detection of a user data publication. In other implementations, the snapshot generation process may be performed in response to a user request to execute the user data.

Upon receipt of the published user data, one or more snapshots of the code execution environment of the user data are generated, as in 854. For example, a compute instance may be identified and the user data executed on the instance, thereby creating the code execution environment that can be captured in the snapshot. The code execution environment may include one or more storage volumes, memory, state files associated with the compute instance on which the user data is executed, metadata indicating one or more parameters (e.g., such as those described with reference to FIG. 7) associated with the code execution environment, and the like. In some implementations, the snapshot is generated based on the user data and/or an existing execution environment in which the user data can be executed (e.g., without actually executing the user data upon detecting the publication of the user data at block 852).

In the example illustrated with respect to FIG. 8B, upon generation of a snapshot of the code execution environment of the user data, and before receipt of a request to execute the user data, a CI group with an included donor memory and donor file system for the user data is initialized on a worker, as in 855.

One or more portions of the snapshot may then be downloaded onto a distributed cache of one or more workers and onto the donor memory of the CI group such that the snapshot is accessible by a donor file system of the CI group so that one or more compute instances of that CI group can be used to execute the user data associated with the snapshot if and when such a request to execute the user data is received, as in 856.

At some time after snapshot generation, a request to execute the user data is received, as in 858. For example, the request may indicate the identity of the user data and one or more arguments or parameters to be used to execute the user data.

Upon receipt of a request to execute the user data, a compute instance is leased, assigned to the CI group that has already been created, and the instance utilized to execute the user data using the snapshot included in the donor memory, as in 860. For example, at least one or more portions of the user data (e.g., one or more initial portions or one or more portions usable to set up the execution environment) executed in response to a user request (e.g., at block 860) may be different from those executed to create the code execution environment to be captured in the snapshot (e.g., at block 854). In some implementations, at block 854, only the initialization portion of the user data may be executed, and at block 860, based on the some or all of the code execution environment or the initialization data being available in the distributed cache and/or donor memory of a CI group (or some other storage accessible by the compute instance being used to execute the user data), the initialization portion of the user data may be skipped and only the remaining portions of the user data may be executed. In other implementations, at block 854, the entire initialization portion of the user data may be executed, and at block 860 based on some or all of the code execution environment or the initialization data being available in the distributed cache and/or the donor memory of the CI group (or some other storage accessible by the compute instance being used to execute the user data), only a portion of the initialization portion of the user data may be executed and the non-initialization portion of the user data may be executed. In yet other implementations, the portions of the user data executed at block 854 and at block 860 may be identical.

After execution of some or all of the user data at block 860, the load order document associated with the snapshot may be updated to include data or chunks of the snapshot actually used during the execution of the user data, as in 862. In some implementations, such data or chunks may be placed ahead of (or indicated as having higher priority than) other data or chunks already in the load order document but was not accessed during the execution of the user data at block 860. For example, the load order document may be used to load chunks of a snapshot into other distributed caches of other workers and/or into other donor memory of other CI groups for the user data. By updating the load order document, the priority of chunk order loading is improved.

Additional portions of the snapshot may then be downloaded onto the distributed cache and/or donor memory based on the updated load order documents, as in 864. In some implementations, block 864 is performed asynchronously and not in response to block 862. More specifically, in some cases, the data/chunks actually accessed during the execution of the user data may have already been added to the distributed cache and/or the donor memory initialized for the CI group to facilitate that access and such data/chunks, even if newly added to the load order document at block 862, may not need to be added to the distributed cache and/or donor memory as they have already been downloaded. Thus, it may be determined, on an ongoing basis based on the most recent version of the load order document at the time, whether additional portions of the snapshot need to be downloaded onto the distributed cache and/or donor memory and download such portions onto the distributed cache as needed. In other implementations, block 864 is performed in response to block 862.

Figure 9:
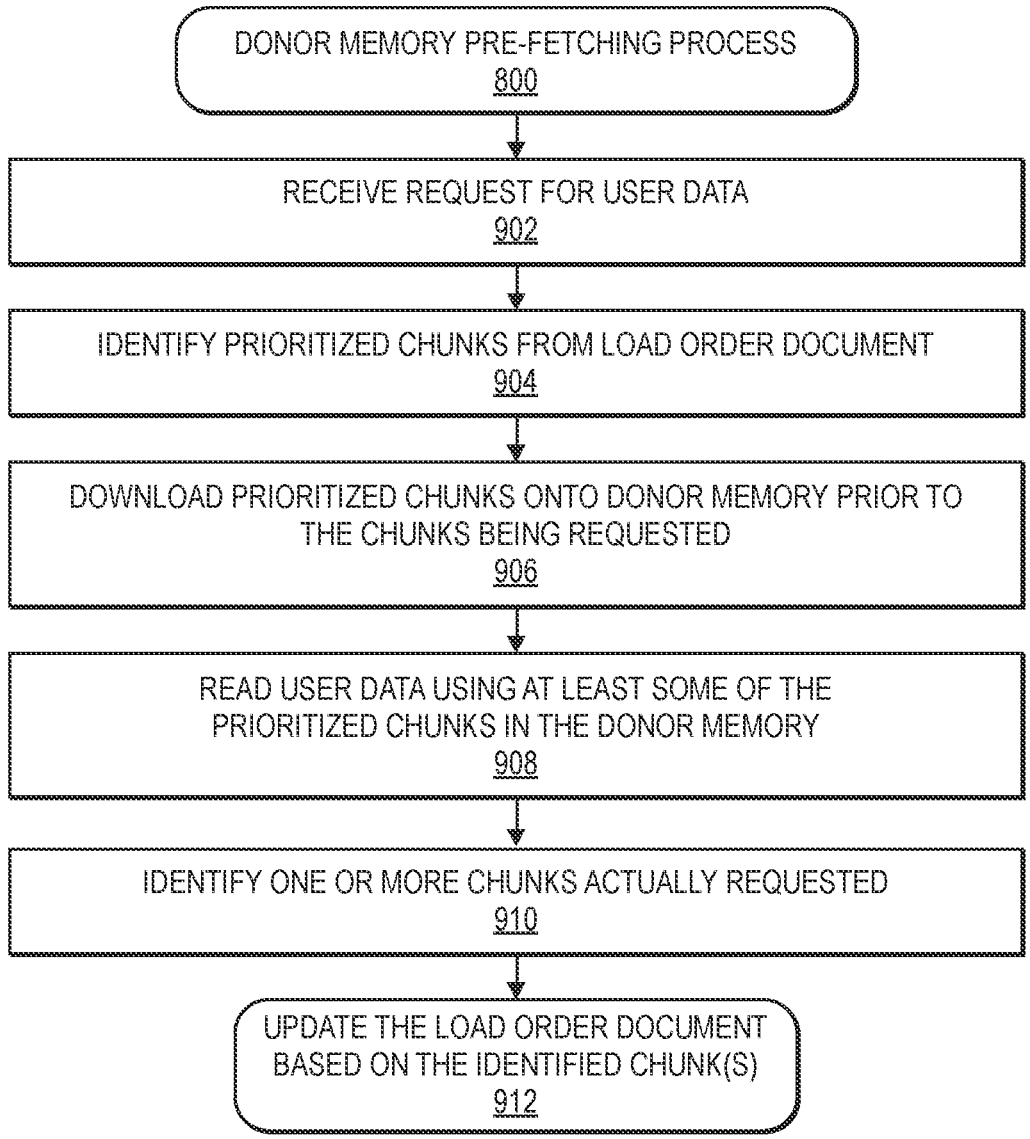
FIG. 9 is an example donor memory pre-fetching process, in accordance with implementations of the present disclosure.

FIG. 9 is an example donor memory pre-fetching process 900, in accordance with implementations of the present disclosure. The example process 900 may be carried out, for example, by the donor file system of a CI group and/or one or more other components of the serverless code execution system 110 described herein.

The example process 900 begins upon receipt of a request to execute the user data, as in 902. For example, the request may indicate the identity of the user data and one or more arguments or parameters to be used to execute the user data.

Upon receipt of a request to execute the user data, one or more prioritized chunks from a load order document associated with the snapshot associated with the user data are identified, as in 904. Although not illustrated in FIG. 9, blocks 904-912 may be performed in parallel to the steps that would be performed in the normal course of executing the user data (e.g., the steps that would be performed when instance cache pre-fetching is not performed). In other implementations, one or more of blocks 904-912 may be performed prior to performing the steps that would be performed in the normal course of executing the user data. In yet other implementations, one or more of blocks 904-912 may be performed subsequent to performing at least some of the steps that would be performed in the normal course of executing the user data.

The prioritized chunks may then be downloaded onto a donor memory of a CI group established for the user data and that is selected to handle the request to execute the user data received at block 902, prior to those prioritized chunks being requested by the execution of the user data, as in 906.

The requested user data may then be executed using at least some of the prioritized chunks pre-fetched onto the donor memory, as in 908. For example, the execution of the user data may request to access chunks pre-fetched onto the donor memory. Such chunks are downloaded from remote storage onto the distributed cache and/or the donor memory of the CI group for use by the execution of the user data. Alternatively, if the chunks are already in the distributed cache, the chunks may be downloaded to the donor memory from the distributed cache.

The example process 900 may then identify one or more chunks of the user data that were actually requested during the execution of the user data, as in 910. In some implementations, all the chunks that were used during a given execution of the user data may be recorded and identified. In other implementations, only those chunks not pre-loaded but accessed during the execution of the user data may be recorded and identified. Finally, the load order document may be updated using the recorded information so that chunks actually requested during execution are prioritized over chunks that were not requested during execution, as in 912. As discussed above, updating the load order document for a user data improves pre-warming and pre-fetching of the user data each time a request is received to execute the user data.

Figure 10:
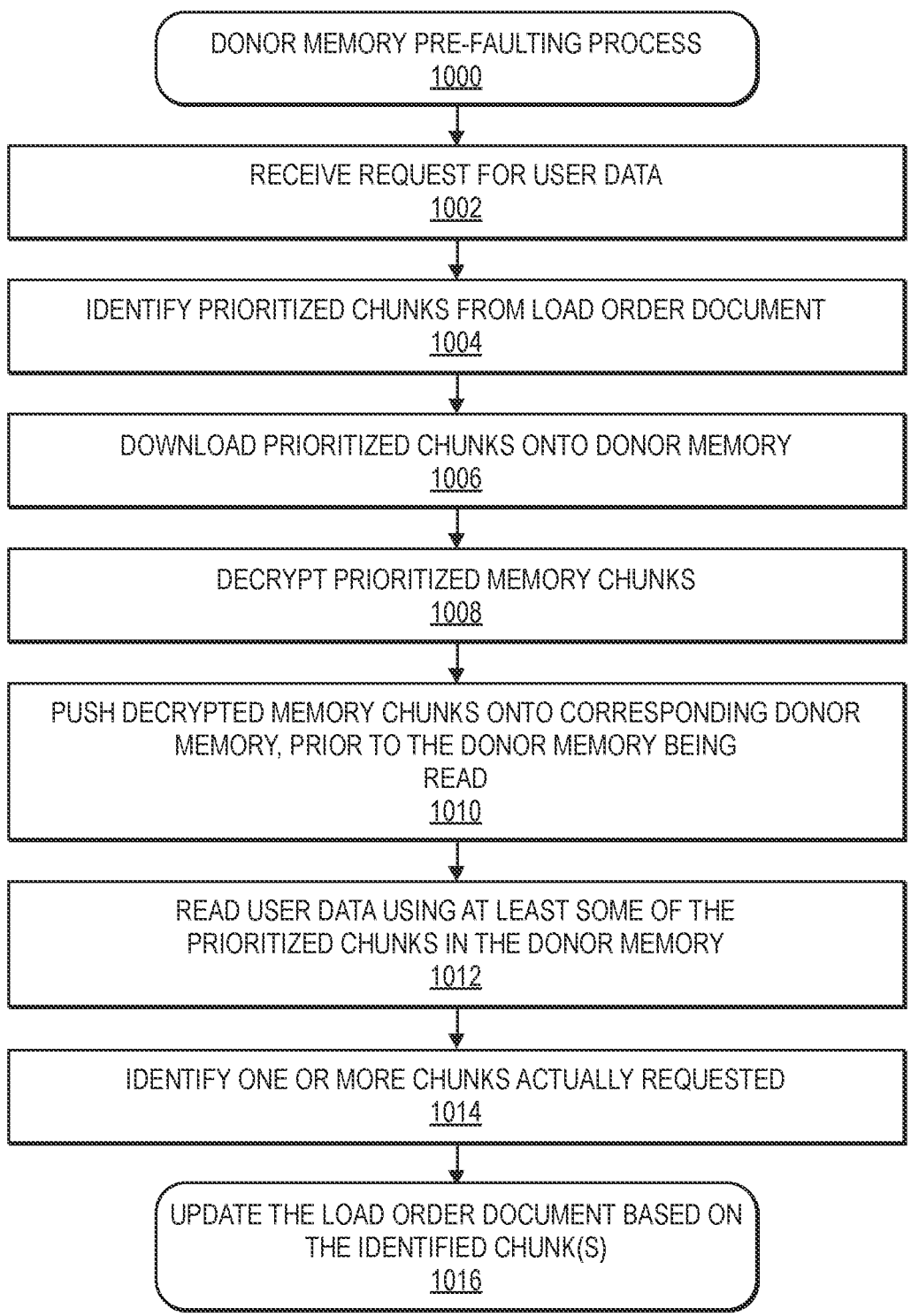
FIG. 10 is an example donor memory pre-faulting process, in accordance with implementations of the present disclosure.

FIG. 10 is an example donor memory pre-faulting process 1000, in accordance with implementations of the present disclosure. The example process 1000 may be carried out, for example, by the donor file system of a CI group and/or by one or more other components of the serverless code execution system described herein.

The example process 1000 begins upon receipt of a request to execute the user data, as in 1002. For example, the request may indicate the identity of the user data and one or more arguments or parameters to be used to execute the user data.

Upon receipt of a request to execute the user data, one or more prioritized memory chunks are identified from a load order document associated with the snapshot associated with the user data, as in 1004. In some implementations, prior to block 1004, the generation number of the load order document may be determined and the example process 1000 may only be performed if the generation number is greater than zero (e.g., indicating that the load order document has been updated at least once in view of execution of the user data). In other implementations, the example pre-faulting process 1000 may only be performed when the generation number is higher than a number greater than zero.

Based on the load order document, the prioritized memory chunks are downloaded onto a donor memory of the CI group to which a compute instance is assigned that will execute the user data, as in 1006. Downloading of the prioritized user chunks may occur before the chunks are requested by the execution of the user data. As discussed above, if a compute instance has already been executing the user data in the CI group, the prioritized memory chunks are already downloaded into the donor memory of the CI group.

The prioritized memory chunks pre-fetched onto the donor memory may then be decrypted, as in 1008. Although not illustrated in FIGS. 8A through 9, in response to a given snapshot chunk (e.g., a memory chunk or a non-memory chunk) that has been pre-loaded onto the distributed cache or the donor memory, the snapshot chunk may be decrypted when downloaded.

The decrypted memory chunks may then be pushed onto corresponding memory of the donor memory, as in 1010. For example, the memory may be identified by memory addresses or memory address ranges in the load order document or in the snapshot.

The user data may then be executed using at least some of the prioritized memory chunks pre-fetched onto the donor memory, as in 1012.

After or during execution of the user data, the memory chunks actually accessed during execution of the user data may be identified, as in 1014, and the load order document updated based on the memory chunks identified as actually accessed during the execution of the user data, as in 1016. In some implementations, all the memory chunks that were used during a given execution of the user data may be recorded and used to update the load order document. In other implementations, only those memory chunks not pre-faulted but accessed during the execution of the user data may be recorded and used to update the load order document.

Figure 11:
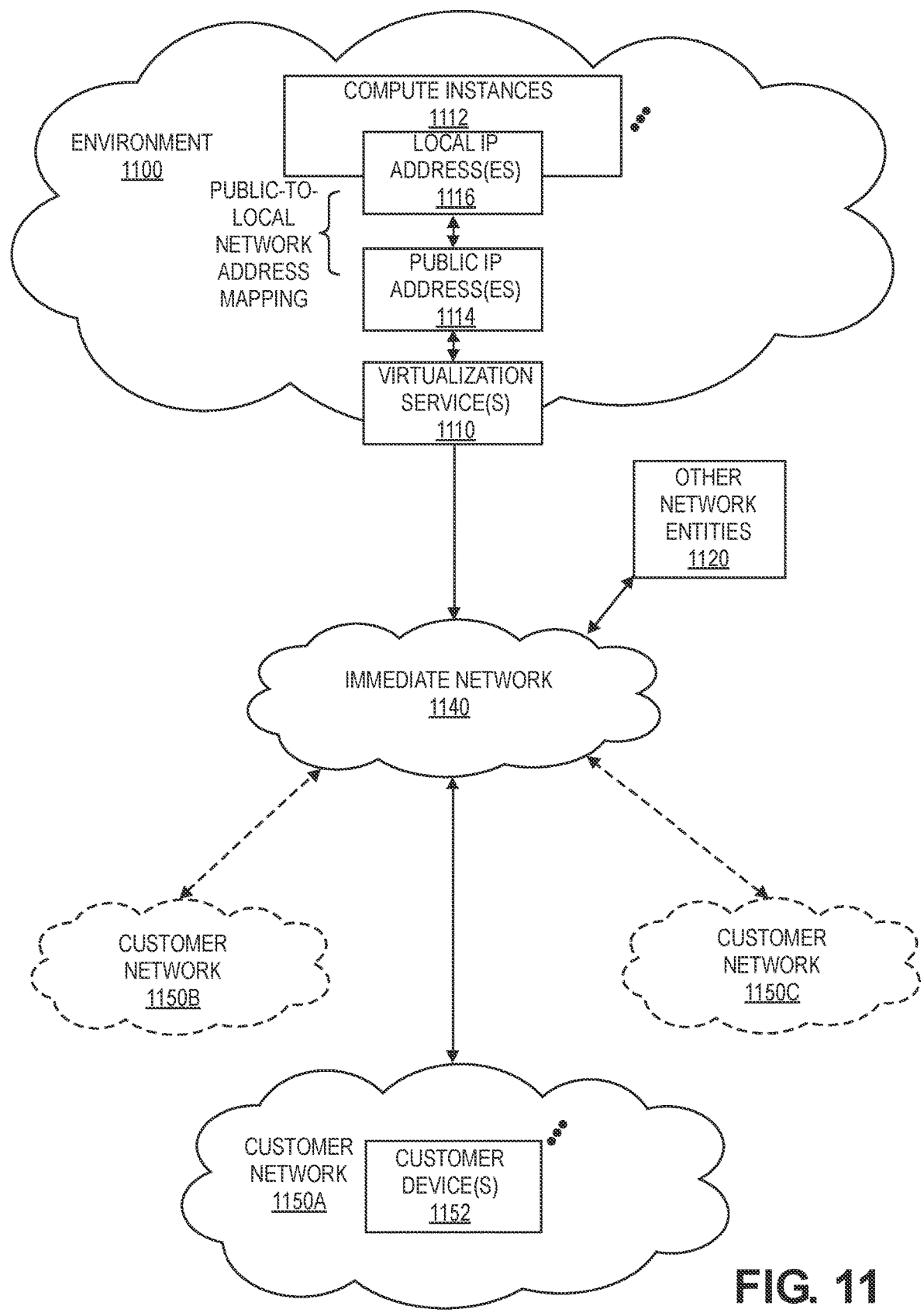
FIG. 11 is an example environment, in accordance with implementations of the present disclosure.

FIG. 11 illustrates an example environment 1100 (or "service provider system") according to some examples.

The environment 1100 can provide resource virtualization to customers via one or more virtualization services 1110 that allow customers to purchase, rent, or otherwise obtain compute instances 1112 of virtualized resources, including but not limited to computation and storage resources, implemented on devices within the serverless code execution environment or networks in one or more data centers. Local Internet Protocol (IP) addresses 1116 can be associated with the compute instances 1112; the local IP addresses are the internal network addresses of the compute instances 1112 on the environment 1100. In some examples, the environment 1100 can also provide public IP addresses 1114 and/or public IP address ranges (e.g., Internet Protocol version 4 (IPv4) or Internet Protocol version 6 (IPv6) addresses) that customers can obtain from the environment 1100.

Conventionally, the environment 1100, via the virtualization services 1110, can allow a customer of the environment (e.g., a customer that operates one or more customer networks 1150A-1150C (or "client networks") including one or more customer device(s) 1152) to dynamically associate at least some public IP addresses 1114 assigned or allocated to the customer with particular compute instances 1112 assigned to the customer. The environment 1100 can also allow the customer to remap a public IP address 1114, previously mapped to one virtualized computing instance 1112 allocated to the customer, to another virtualized computing instance 1112 that is also allocated to the customer. Using the virtualized computing instances 1112 and public IP addresses 1114 provided by the service provider, a customer of the service provider such as the operator of the customer network(s) 1150A-1150C can, for example, implement customer-specific applications and present the customer's applications on an intermediate network 1140, such as the Internet. Other network entities 1120 on the intermediate network 1140 can then generate traffic to a destination public IP address 1114 published by the customer network(s) 1150A-1150C; the traffic is routed to the service provider data center, and at the data center is routed, via a network substrate, to the local IP address 1116 of the virtualized computing compute instance 1112 currently mapped to the destination public IP address 1114. Similarly, response traffic from the virtualized computing compute instance 1112 can be routed via the network substrate back onto the intermediate network 1140 to the other network entities 1120.

Local IP addresses, as used herein, refer to the internal or "private" network addresses, for example, of compute instances in a serverless code execution environment. Local IP addresses can be within address blocks reserved by Internet Engineering Task Force (IETF) Request for Comments (RFC) 1918 and/or of an address format specified by IETF RFC 4193 and can be mutable within the serverless code execution environment. Network traffic originating outside the serverless code execution environment is not directly routed to local IP addresses; instead, the traffic uses public IP addresses that are mapped to the local IP addresses of the compute instances. The serverless code execution environment can include networking devices or appliances that provide network address translation (NAT) or similar functionality to perform the mapping from public IP addresses to local IP addresses and vice versa.

Public IP addresses are Internet mutable network addresses that are assigned to compute instances, either by the service provider or by the customer. Traffic routed to a public IP address is translated, for example via 1:1 NAT, and forwarded to the respective local IP address of a compute instance.

Some public IP addresses can be assigned by the serverless code execution environment infrastructure to particular compute instances; these public IP addresses can be referred to as standard public IP addresses, or simply standard IP addresses. In some examples, the mapping of a standard IP address to a local IP address of a compute instance is the default launch configuration for all compute instance types.

At least some public IP addresses can be allocated to or obtained by customers of the environment 1100; a customer can then assign their allocated public IP addresses to particular compute instances allocated to the customer. These public IP addresses can be referred to as customer public IP addresses, or simply customer IP addresses. Instead of being assigned by the environment 1100 to compute instances as in the case of standard IP addresses, customer IP addresses can be assigned to compute instances by the customers, for example via an API provided by the service provider. Unlike standard IP addresses, customer IP addresses are allocated to customer accounts and can be remapped to other compute instances by the respective customers as necessary or desired. A customer IP address is associated with a customer's account, not a particular compute instance, and the customer controls that IP address until the customer chooses to release it. Unlike conventional static IP addresses, customer IP addresses allow the customer to mask compute instance or availability zone failures by remapping the customer's public IP addresses to any compute instance associated with the customer's account. The customer IP addresses, for example, enable a customer to engineer around problems with the customer's compute instances or software by remapping customer IP addresses to replacement compute instances.

Figure 12:
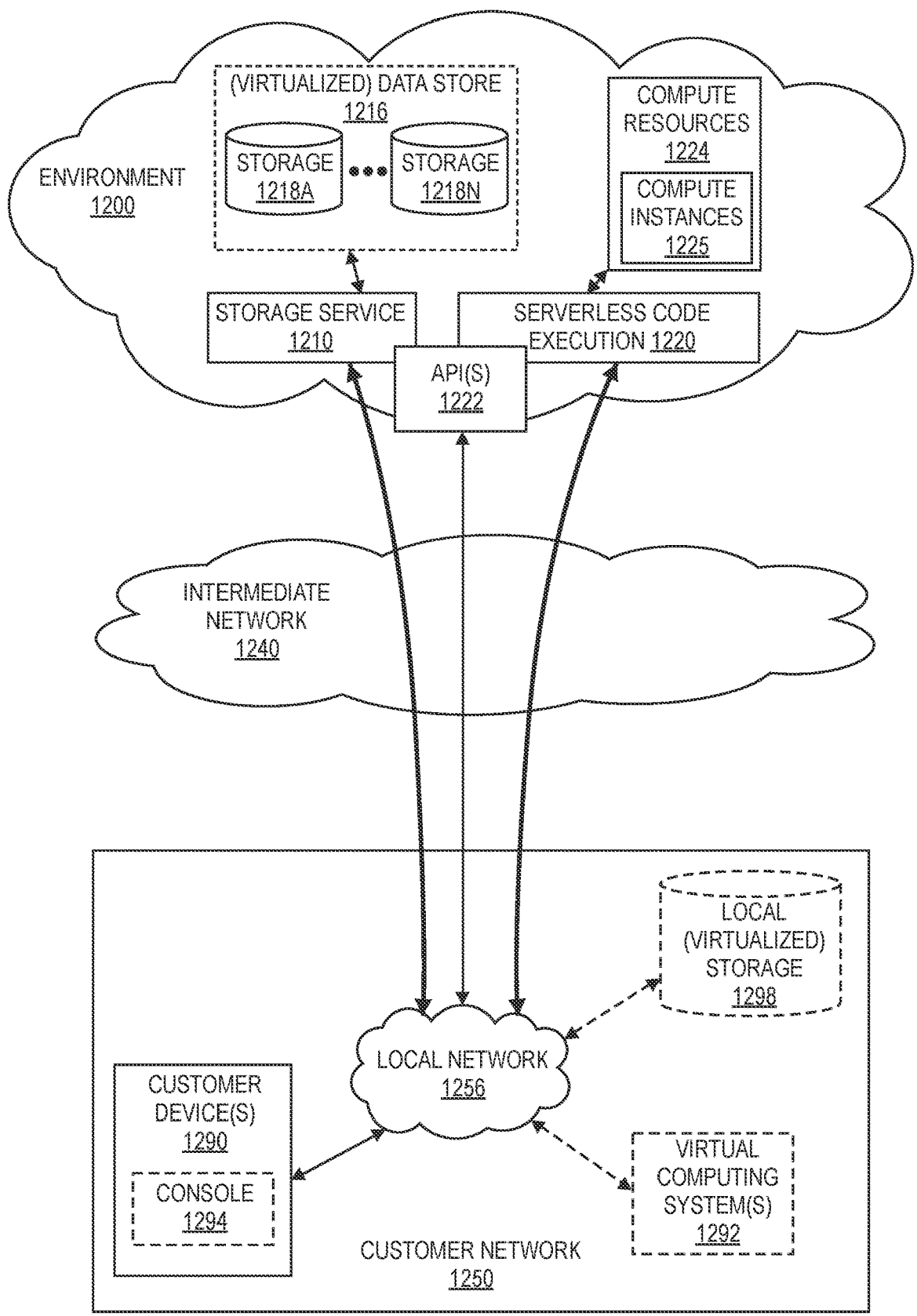
FIG. 12 is a block diagram of an example that provides a storage service and a serverless code execution service to customers, in accordance with implementations of the present disclosure.

FIG. 12 is a block diagram of an example environment 1200 that provides a compute service, a storage service, and a serverless code execution service to customers, according to some examples. The environment 1200 can be a cloud provider network in some implementations. Cloud provider networks often provide access to computing resources via a defined set of regions, availability zones, and/or other defined physical locations where a cloud provider network clusters data centers. In many cases, each region represents a geographic area (e.g., a U.S. East region, a U.S. West region, an Asia Pacific region, and the like) that is physically separate from other regions, where each region can include two or more availability zones connected to one another via a private high-speed network, e.g., a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time, but close enough together to meet a latency requirement for intra-region communications. The data centers house physical computing devices (e.g., suitable types of servers) that host the bare metal and virtualized resources (e.g., compute, networking, & storage) on which cloud services and customer workloads run.

Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). In some implementations, the cloud provider network can include one or more cellular networks (such as a public or private 4G, 5G, or other "G" network) that run at least partly on the cloud's infrastructure. This compartmentalization and geographic distribution of computing hardware enables the cloud provider network to provide low-latency resource access to customers on a global scale with a high degree of fault tolerance and stability. This infrastructure design also enables users of a cloud provider network to design their applications to run in multiple physical availability zones and/or multiple regions to achieve greater fault-tolerance and availability. For example, because the various regions and physical availability zones of a cloud provider network are connected to each other with fast, low-latency networking, users can architect applications that automatically failover between regions and physical availability zones with minimal or no interruption to users of the applications should an outage or impairment occur in any particular region.

A compute service of the environment (referred to in various implementations as an elastic compute cloud service, an elastic compute service, a virtual machine service, a computing cloud service, a compute engine, or a cloud compute service) provides multiple compute resources 1224 (e.g., compute instances 1225, such as VMs) to customers including external customers as well as other services. The compute resources 1224 can, for example, be used in a serverless code execution service 1220. The compute resources 1224 may also be used as the basis for a container orchestration and management service (referred to in various implementations as a container service, cloud container service, container engine, or container cloud service).

The compute service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance families. An instance family may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, or a non-burstable or dedicated instance type that is allotted and guaranteed a fixed quantity of resources). Each instance family can have a specific ratio of processing, local storage, memory, and networking resources, and different instance families may have differing types of these resources as well. Multiple sizes of these resource configurations can be available within a given instance family, referred to as "instance types." Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification.

As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the customer for performing tasks specified by the customer.

Each computation resource 1224 can be provided with one or more local IP addresses. The serverless code execution environment 1200 can be configured to route packets from the local IP addresses of the compute resources 1224 to public Internet destinations, and from public Internet sources to the local IP addresses of the compute resources 1224.

Traditionally, customers could request compute capacity from the environment 1200 to run their workloads, which would then be provisioned in the customer's account. However, this requires the customer to manage the lifecycle of the provisioned compute, including making sure the operating system of the instance remains patched and up to date, among other tasks. Accordingly, the serverless code execution service 1220 can provide the customer the ability to simply provide their code/software that needs to be run, and the serverless code execution service 1220 will obtain the required compute capacity from the compute service and provision this in a service provider account to be managed on behalf of the customer. In some examples, the serverless code execution service 1220 can provide one or more APIs 1222, for example a web services interface, via which the customer network 1250 can access functionality provided by the serverless code execution service 1220, for example via a console 1294 (e.g., a web-based application, standalone application, mobile application, etc.) of a customer device 1290.

From an instance of the virtual computing system(s) 1292 and/or another customer device 1290 (e.g., via console 1294), the customer can access the functionality of a storage service 1210, for example via the one or more APIs 1222, to access data from and store data to storage resources 1218A-1218N of a virtual data store 1216 (e.g., a folder or "bucket," a virtualized volume, a database, cloud disk, storage disk, cloud volume, disk, block volume, or simply "volume," etc.) provided by the environment 1200. In some examples, a virtualized data store gateway (not shown) can be provided at the customer network 1250 that can locally cache at least some data, for example frequently accessed or critical data, and that can communicate with the storage service 1210 via one or more communication channels to upload new or modified data from a local cache so that the primary store of data (the virtualized data store 1216) is maintained. In some examples, a user, via the virtual computing system 1292 and/or another customer device 1290, can mount and access virtual data store 1216 volumes via the storage service 1210 acting as a storage virtualization service, and these volumes can appear to the user as local (virtualized) storage 1298.

The storage service 1210 and/or the storage resources 1216 may include or provide an elastic block store service (referred to in various implementations as a cloud disks service, a managed disk service, a cloud block storage service, a persistent disk service, or a block volumes service) and/or a simple storage service (referred to in various implementations as an object storage service, blob storage service, cloud object storage service, cloud storage service, etc.) that may receive, store, and/or execute user data.

As used herein, a server or drive "hosting" a volume refers to that storage device storing at least a portion (e.g., a partition, a set of blocks, recently logged data, or flushed data) of the data of the volume and implementing instructions for managing that portion of the volume (e.g., handling I/O to and from the volume, replication of the volume, transfer of volume data to and from other storage systems).

In general, a volume can correspond to a logical collection of data, such as a set of data maintained on behalf of a user. The data of the volume may be erasure coded and/or replicated between multiple devices within a distributed computing system, in order to provide multiple replicas of the volume (where such replicas may collectively represent the volume on the computing system). Replicas of a volume in a distributed computing system can beneficially provide for automatic failover and recovery, for example by allowing the user to access either a primary replica of a volume or a secondary replica of the volume that is synchronized to the primary replica at a block level, such that a failure of either the primary or secondary replica does not inhibit access to the information of the volume. The role of the primary replica can be to facilitate reads and writes (sometimes referred to as "input output operations," or simply "I/O operations") at the volume, and to propagate any writes to the secondary (preferably synchronously in the I/O path, although asynchronous replication can also be used). The secondary replica can be updated synchronously with the primary replica and provide for seamless transition during failover operations, whereby the secondary replica assumes the role of the primary replica, and either the former primary is designated as the secondary or a new replacement secondary replica is provisioned. Although certain examples herein discuss a primary replica and a secondary replica, it will be appreciated that a logical volume can include multiple secondary replicas.

The client may represent instructions that enable a compute instance to connect to, and perform I/O operations at, a remote data volume (e.g., a data volume stored on a physically separate computing device accessed over a network). The client may be implemented on an offload card that is connected to and controls the server that includes the processing units (e.g., CPUs or GPUs) of the compute instance.

The virtualization service(s) can also be accessed from compute instances within the environment 1200 via the API(s) 1222. For example, a customer, appliance service provider, or other entity can access a virtualization service from within a respective virtual network on the environment 1200 via the API(s) 1222 to request allocation of one or more compute instances within the virtual network or within another virtual network.

Figure 13:
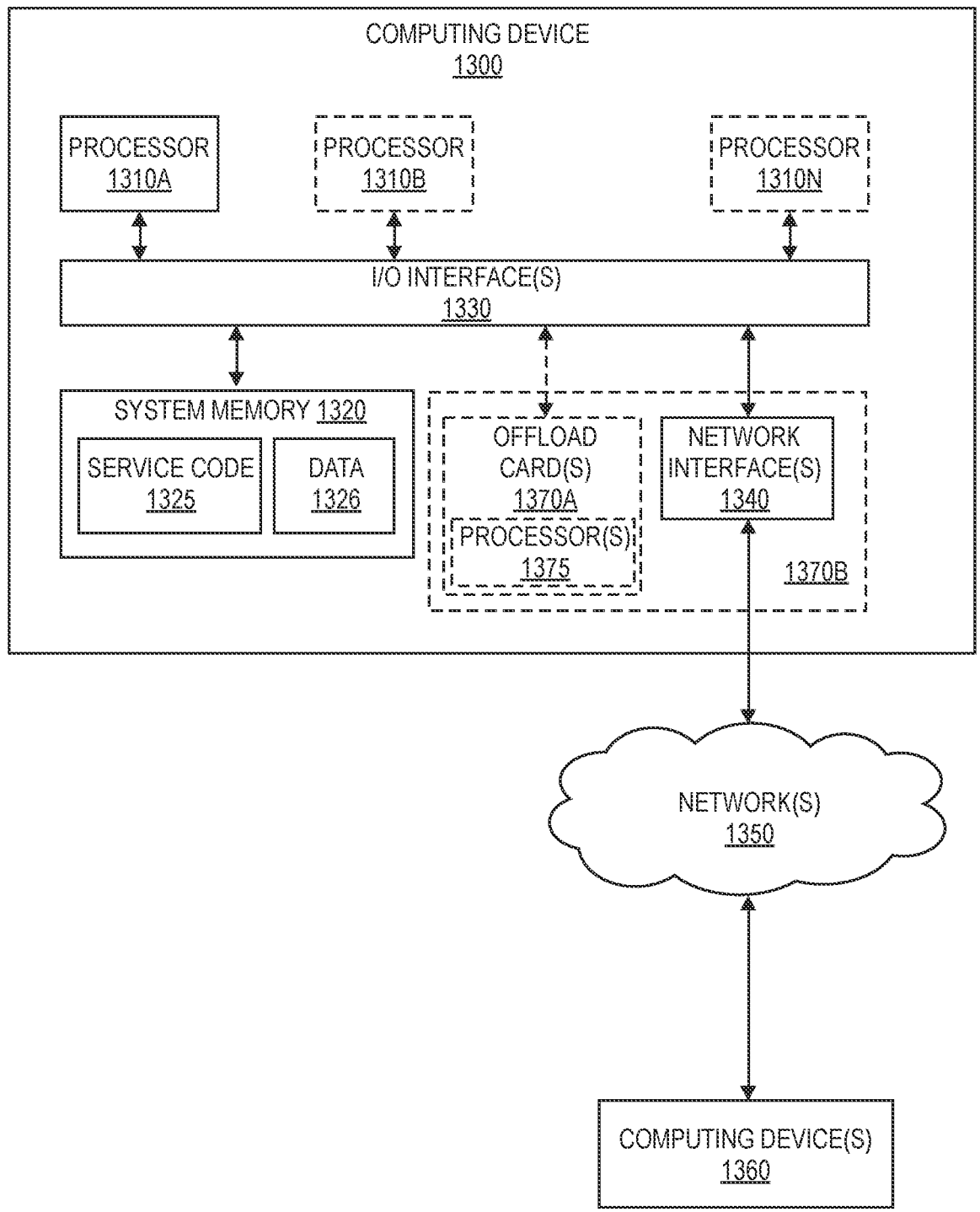
FIG. 13 is a block diagram illustrating an example computing device that can be used, in accordance with implementations of the present disclosure.

In some examples, a system that implements a portion or all of the techniques described herein can include a general-purpose computer system, such as the computing device 1300 (also referred to as a computing system or electronic device) illustrated in FIG. 13, that includes, or is configured to access, one or more computer-accessible media. In the illustrated example, the computing device 1300 includes one or more processors 1310 coupled to a system memory 1320 via an input/output (I/O) interface 1330. The computing device 1300 further includes a network interface 1340 coupled to the I/O interface 1330. While FIG. 13 shows the computing device 1300 as a single computing device, in various examples the computing device 1300 can include one computing device or any number of computing devices configured to work together as a single computing device 1300.

In various examples, the computing device 1300 can be a uniprocessor system including one processor 1310, or a multiprocessor system including several processors 1310 (e.g., two, four, eight, or another suitable number), such as processors 1310A, 1310B, through 1310N. The processor(s) 1310 can be any suitable processor(s) capable of executing instructions. For example, in various examples, the processor(s) 1310 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1310 can commonly, but not necessarily, implement the same ISA.

The system memory 1320 can store instructions and data accessible by the processor(s) 1310. In various examples, the system memory 1320 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1320 as service code 1325 (e.g., executable to implement, in whole or in part, the managed compute service or portions thereof) and data 1326.

In some examples, the I/O interface 1330 can be configured to coordinate I/O traffic between the processor(s) 1310, the system memory 1320, and any peripheral devices in the device, including the network interface 1340 and/or other peripheral interfaces (not shown). In some examples, the I/O interface 1330 can perform any necessary protocol, timing, or other data transformations to convert data signals from one component (e.g., the system memory 1320) into a format suitable for use by another component (e.g., the processor 1310). In some examples, the I/O interface 1330 can include support for devices attached through various types of peripheral buses, such as a variant of the Peripheral Component Interconnect (PCI) bus standard or the Universal Serial Bus (USB) standard, for example. In some examples, the function of the I/O interface 1330 can be split into two or more separate components, such as a north bridge and a south bridge, for example. Also, in some examples, some or all of the functionality of the I/O interface 1330, such as an interface to the system memory 1320, can be incorporated directly into the processor(s) 1310.

The network interface 1340 can be configured to allow data to be exchanged between the computing device 1300 and other computing devices 1360 attached to a network or networks 1350, such as other computer systems or devices as illustrated in FIG. 1 (e.g., client devices and/or auxiliary devices), for example. In various examples, the network interface 1340 can support communication via any suitable wired or wireless general data networks, such as types of Ethernet network, for example. Additionally, the network interface 1340 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1300 includes one or more offload cards 1370A or 1370B (including one or more processors 1375, and possibly including the one or more network interfaces 1340) that are connected using the I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1300 can act as a host electronic device (e.g., operating as part of a serverless code execution service) that hosts compute resources such as compute instances, and the one or more offload cards 1370A or 1370B execute a virtualization manager that can manage compute instances that execute on the host electronic device. As an example, in some examples the offload card(s) 1370A or 1370B can perform compute instance management operations, such as pausing and/or un-pausing compute instances, launching and/or terminating compute instances, performing memory transfer/copying operations, etc. These management operations can, in some examples, be performed by the offload card(s) 1370A or 1370B in coordination with a hypervisor (e.g., upon a request from a hypervisor) that is executed by the other processors 1310A-1310N of the computing device 1300. However, in some examples the virtualization manager implemented by the offload card(s) 1370A or 1370B can accommodate requests from other entities (e.g., from compute instances themselves), and cannot coordinate with (or service) any separate hypervisor.

In some examples, the system memory 1320 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1300 via the I/O interface 1330. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1300 as the system memory 1320 or another type of memory. Further, a computer-accessible medium can include transmission media or signals such as electrical, electromagnetic, or digital signals, conveyed via a communication medium such as a network and/or a wireless link, such as can be implemented via the network interface 1340.

Various examples discussed or suggested herein can be implemented in a wide variety of operating environments, which in some cases can include one or more user computers, computing devices, or processing devices which can be used to operate any of a number of applications. User or user devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java® servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl®, Python®, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1218A-1218N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on," "based at least in part on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C. Similarly, unless otherwise explicitly stated, terms such as "set" and "collection" and "pool" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method, comprising:
    receiving a first request to execute a user code represented as a container image;
    in response to the first request:
        establishing a donor memory as a copy-on-read memory that is accessible by a plurality of compute instances;
        causing a first portion of the user code to be downloaded onto the donor memory such that the first portion of the user code is accessible from the donor memory;
        establishing, for a first compute instance of the plurality of compute instances, a first compute instance memory as a first copy-on-write memory that is only accessible by the first compute instance; and
        causing the user code to be executed by the first compute instance without copying the first portion of the user code to the first compute instance memory, wherein:
            a first read request by the first compute instance is read from the donor memory; and
            a first write request by the first compute instance is written to the first compute instance memory without writing to the donor memory;
    receiving a second request to execute the user code; and
    in response to the second request:
        establishing, for a second compute instance of the plurality of compute instances, a second compute instance memory as a second copy-on-write that is only accessible by the second compute instance; and
        causing the user code to be executed by the second compute instance without copying the user code to the second compute instance memory, wherein:
            a second read request by the second compute instance is accessed from the donor memory; and
            a second write request by the second compute instance is written to the second compute instance memory.

2. The computer-implemented method of claim 1, further comprising:
    determining that the first read request corresponds to a second portion of the user code that is not included in the donor memory;
    causing the second portion of the user code to be downloaded to the donor memory from at least one of a distributed cache or a memory that is remote from the distributed cache, the donor memory, and the plurality of compute instances; and
    causing the first compute instance to access the second portion of the user code from the donor memory without copying the second portion of the user code to the first compute instance memory.

3. The computer-implemented method of claim 2, further comprising:
    determining that the second read request from the second compute instance corresponds to the second portion of the user code; and
    causing the second compute instance to access the second portion of the user code from the donor memory without copying the second portion of the user code to the second compute instance memory.

4. The computer-implemented method of claim 1, further comprising:
    subsequent to causing the user code to be executed by the first compute instance, determining that the first compute instance is to be shut down; and
    causing the first compute instance to be shut down without shutting down the donor memory.

5. A system, comprising:
    one or more processors; and
    a memory storing program instructions that, when executed by the one or more processors, cause the one or more processors to at least:
        establish a donor memory on a worker;
        store a first portion of a user data on the donor memory;
        initialize, on the worker, a first compute instance with a first compute instance memory;
        cause a first read request by the first compute instance to read the first portion of the user data from the donor memory without copying the first portion of the user data to the first compute instance memory; and
        cause a first write request by the first compute instance to write to the first compute instance memory without writing to the donor memory.

6. The system of claim 5, wherein the program instructions that, when executed by the one or more processors, further cause the one or more processors to at least:
    initialize, on the worker, a second compute instance with a second compute instance memory; and
    cause a second read request of the first portion of the user data by the second compute instance to read the first portion from the user data on the donor memory without copying the first portion of the user data to the second compute instance memory.

7. The system of claim 5, wherein the program instructions that, when executed by the one or more processors, further cause the one or more processors to at least:
    receive a request to execute the first portion of the user data on a compute instance of the plurality of compute instances; and
    establish the donor memory and the first compute instance in response to the request.

8. The system of claim 5, wherein the program instructions that, when executed by the one or more processors, further cause the one or more processors to at least:
    determine, in response to a second read request from the first compute instance, that a second portion of the user data is not stored in the donor memory;

cause the second portion of the user data to be stored in the donor memory, without storing the second portion of the user data in the first compute instance memory; and cause the first compute instance to read the second portion of the user data from the donor memory, without copying the second portion of the user data to the first compute instance memory.

9. The system of claim 5, wherein the program instructions that, when executed by the one or more processors, further cause the one or more processors to at least:

establish a donor file system on the worker that may be accessed by the first compute instance; and establish a first compute instance file system that is specific to the first compute instance.

10. The system of claim 5, wherein the program instructions that, when executed by the one or more processors, further cause the one or more processors to at least:

receive a request to execute the user data;

determine that a minimum number of donor memories have not been established; and in response to determination that the minimum number of donor memories have not been established:

establish, on a second worker, a second donor memory;

store the first portion of the user data on the second donor memory;

initialize a second compute instance with a second compute instance memory; and cause a second read request by the second compute instance to read the first portion of the user data from the second donor memory, without copying the first portion of the user data to the second compute instance memory.

11. The system of claim 5, wherein the program instructions that, when executed by the one or more processors, further cause the one or more processors to at least:

subsequent to initialization of the first compute instance, determine that a defined number of requests by the first compute instance have occurred; and in response to determination that the defined number of requests have occurred, shut down the first compute instance.

12. The system of claim 11, wherein the defined number of requests is one.

13. The system of claim 5, wherein the donor memory is a copy-on-read memory such that the first portion of the user data is stored in the donor memory in response to a read request for the first portion of the user data.

14. The system of claim 5, wherein the first compute instance memory is a copy-on-write memory such that write requests issued by the first compute instance are written to the first compute instance memory.

15. A method, comprising:

receiving a first request to execute a user data;

in response to the first request, initializing a first compute instance such that the first compute instance accesses a portion of the user data from a donor memory without copying the portion of the user data from the donor memory to a first compute instance memory of the first compute instance;

receiving a second request to execute the user data;

in response to the second request, initializing a second compute instance such that the second compute instance accesses the portion of the user data from the donor memory without copying the portion of the user data from the donor memory to a second compute instance memory of the second compute instance;

receiving a third request from the first compute instance;

completing the third request; and shutting down the first compute instance without shutting down the donor memory.

16. The method of claim 15, further comprising:

in response to a write request by the first compute instance, causing the first compute instance to write to the first compute instance memory, without writing to the donor memory.

17. The method of claim 15, wherein the first compute instance memory is not accessible by the second compute instance.

18. The method of claim 15, further comprising:

receiving a fourth request to execute the user data;

establishing a second donor memory on a second worker, wherein the donor memory, the first compute instance, and the second compute instance reside on a first worker that is different than the second worker;

storing the portion of the user data on the second donor memory; and initializing a third compute instance on the second worker such that the third compute instance accesses the portion of the user data from the second donor memory without copying the portion of the user data from the second donor memory to a third compute instance memory of the third compute instance.

19. The method of claim 18, further comprising:

receiving, from the first compute instance, a read request for a second portion of the user data that is not stored on the donor memory;

in response to the read request, downloading onto the donor memory the second portion of the user data;

allowing access by the first compute instance to the second portion of the user data without the first compute instance copying the second portion of the user data from the donor memory; and subsequent to the downloading and prior to a second request for the second portion of the user data by the third compute instance, downloading the second portion of the user data to the second donor memory such that the second portion of the user data is stored in the second donor memory and accessible by the third compute instance.

20. The method of claim 15, further comprising:

prior to receiving the first request, receiving a fourth request to execute the portion of the user data on a third compute instance; and establish the donor memory and the third compute instance in response to the fourth request.

* * * * *